US010773704B1

(12) United States Patent
Rollinger et al.

(10) Patent No.: US 10,773,704 B1
(45) Date of Patent: Sep. 15, 2020

(54) SYSTEMS AND METHODS FOR CONTROLLING ENGINE OPERATION TO SUPPORT EXTERNAL ELECTRIC LOADS

(71) Applicant: Ford Global Technologies, LLC, Dearborn, MI (US)

(72) Inventors: John Rollinger, Troy, MI (US); Alexander O'Connor Gibson, Ann Arbor, MI (US); Scott Thompson, Belleville, MI (US)

(73) Assignee: Ford Gloabal Technologies, LLC, Dearborn, MI (US)

( * ) Notice: Subject to any disclaimer, the term of this patent is extended or adjusted under 35 U.S.C. 154(b) by 0 days.

(21) Appl. No.: 16/373,949

(22) Filed: Apr. 3, 2019

(51) Int. Cl.
 F02D 41/00 (2006.01)
 B60W 10/06 (2006.01)
 F02M 26/47 (2016.01)
 F02M 26/00 (2016.01)

(52) U.S. Cl.
 CPC ............ B60W 10/06 (2013.01); F02M 26/47 (2016.02); *F02M 2026/004* (2016.02)

(58) Field of Classification Search
 CPC ...... F02D 41/08; F02D 41/083; F02D 31/003; F02D 2200/1006; F02P 5/04; F02P 5/045; F02P 5/14
 USPC .............. 123/339.16–339.18, 319, 232, 325, 123/406.47, 406.48, 406.59, 406.64
 See application file for complete search history.

(56) References Cited

U.S. PATENT DOCUMENTS

| 3,621,370 A | 11/1971 | Vandervort |
| 4,099,067 A | 7/1978 | Szentes et al. |
| 6,014,015 A | 1/2000 | Thorne et al. |
| 6,736,120 B2 | 5/2004 | Surnilla |
| 7,024,859 B2 | 4/2006 | Jayabalan et al. |
| 7,231,994 B2 | 6/2007 | Buglione et al. |
| 7,347,168 B2 | 3/2008 | Reckels et al. |
| 8,249,795 B2 | 8/2012 | Surnilla et al. |
| 8,616,186 B2 | 12/2013 | Surnilla et al. |
| 8,950,182 B2 | 2/2015 | Roth |

(Continued)

FOREIGN PATENT DOCUMENTS

WO 2014202204 A1 12/2014

OTHER PUBLICATIONS

Heywood, J., "Internal Combustion Engine Fundamentals," McGraw-Hill Series in Mechanical Engineering, 1st Edition, McGraw-Hill Inc., Apr. 1, 1988, 481 pages.

(Continued)

*Primary Examiner* — John Kwon
(74) *Attorney, Agent, or Firm* — Geoffrey Brymbaugh McCoy Russell LLP

(57) ABSTRACT

Methods and systems are provided for controlling operation of an engine of a vehicle to supply power to a power box that in turn supplies power to loads external to the vehicle. In one example, a method comprises, via a controller, detecting that the vehicle is in a condition of reduced air exchange, and in response to a request to operate the engine to supply power to the power box, alerting the vehicle operator of the condition and discontinuing engine operation if a response to the alert is not received within a threshold duration. In this way, engine control strategy may account for the condition of reduced air exchange when the vehicle operator has acknowledged that the engine is operating under such conditions.

20 Claims, 12 Drawing Sheets

(56) References Cited

U.S. PATENT DOCUMENTS

| | | |
|---|---|---|
| 9,074,542 B2 | 7/2015 | Henry et al. |
| 9,352,635 B1* | 5/2016 | Schepmann ....... B60H 1/00392 |
| 9,556,810 B2 | 1/2017 | Bizub |
| 9,679,486 B2 | 6/2017 | Li et al. |
| 2005/0109550 A1 | 5/2005 | Buglione et al. |
| 2005/0167090 A1 | 8/2005 | Kennedy |
| 2009/0018702 A1 | 1/2009 | Oakes |
| 2009/0294191 A1 | 12/2009 | Sheidler et al. |
| 2010/0100306 A1 | 4/2010 | Gamache et al. |
| 2011/0317361 A1* | 12/2011 | Schimpl ............... G01D 11/245 |
| | | 361/692 |
| 2013/0284415 A1* | 10/2013 | Katoh ................. B60H 1/3227 |
| | | 165/175 |
| 2014/0352671 A1* | 12/2014 | Neal ........................ B23P 6/00 |
| | | 123/568.12 |
| 2015/0325891 A1* | 11/2015 | Inoue ...................... B60K 1/04 |
| | | 180/68.1 |
| 2016/0361971 A1* | 12/2016 | Galbas ............... B60H 1/00778 |

OTHER PUBLICATIONS

Stuart, S. et al., "Systems and Methods for Controlling Engine Operation to Support External Electric Loads," U.S. Appl. No. 16/374,006, filed Apr. 3, 2019, 109 pages.

* cited by examiner

SYSTEMS AND METHODS FOR CONTROLLING ENGINE OPERATION TO SUPPORT EXTERNAL ELECTRIC LOADS

FIELD

The present description relates generally to methods and systems for controlling operation of an engine while the engine is being utilized to support external electrical loads, particularly in cases where the engine is ingesting unmetered exhaust gas.

BACKGROUND/SUMMARY

Passenger vehicles, light trucks and heavy duty trucks may in some examples include an ability to support 110V-120V alternating current (AC) and 220V-240V AC electrical loads. As an example, such vehicles may support electrical loads up to around 450 Watts, and in the future may support electrical loads from 2KW-8KW and potentially higher (e.g. 16KW and greater). Systems for such vehicles may include designs for directly supporting such appliances either while the vehicle is stationary, for example for use at a job site or for supplying electricity to home electrical loads, or while the vehicle is moving, for example to power a refrigeration unit. Such systems may comprise direct current (DC) to AC systems, and may be referred to as a power to the box (PttB) system. Such PttB systems may be driven either by an alternator, a belt-integrated starter generator (BISG) driven by the engine or by a high voltage battery (e.g. 300V-350V) which is in turn charged by a crank ISG (CISG).

In cases where a PttB system is in operation to power external electrical load(s) and where the vehicle is moving, it may be expected that air in an intake manifold of the engine is either fresh air, or if the vehicle is operating with exhaust gas recirculation (EGR), the EGR mass is measured and accounted for in the fresh air mass calculation. However, there may be circumstances where the PttB system is being utilized under conditions where vehicle exhaust external to the vehicle may build to a level where unmetered EGR is ingested into the engine. As an example, if the vehicle is being operated in PttB mode in a situation where exhaust gas is not routed away from the vicinity of the vehicle but instead builds in concentration over time, such a situation may effectively increase the level of (e.g. concentration of) exhaust gas of air in the vicinity of the vehicle. A rate of such an increase may be a function of at least initial air mass in a volume of space where the level of exhaust gas in the air in the vicinity of the vehicle is increasing, vehicle exhaust mass flow rate, and any sources of air exchange for the particular volume of space where the level of exhaust gas in the air is increasing.

As percent EGR increases for a gasoline engine for a particular timing of spark provided to engine cylinder(s), burn duration for the combustion of air and fuel may increase as well. Such an increase in burn duration initially may lead to a reduction in net cylinder torque, while at higher levels (e.g. greater than 10% EGR) combustion stability for the engine may become degraded which may lead to incomplete combustion and/or misfires. At even higher levels (e.g. greater than 20% EGR), a reduction in delivered crankshaft torque may result.

To mitigate such undesirable aspects that may result as a function of increasing EGR inducted to engine cylinders, engine control strategy may rely on spark timing advance to engine cylinders to compensate for increased burn duration, which may maintain crankshaft torque at desired levels. However, as the level of EGR being inducted to engine cylinders increases beyond a particular level (e.g. 20%), issues related to combustion stability may result even with increases in spark advance. At higher levels still, engine hesitation and/or stall may result, which may compromise the ability of the engine to support the PttB electrical load.

The inventors herein have recognized the above-mentioned issues, and have herein developed systems and methods to at least partially address them. In one example, a method comprises via a controller, detecting that a vehicle is in a condition of reduced air exchange, and in response to a request to operate an engine of the vehicle to power one or more loads external to the vehicle while the vehicle is stationary, generating an alert pertaining to the condition of reduced air exchange, and discontinuing engine operation if a response to the alert is not received from a vehicle operator within a threshold duration. The condition of reduced air exchange may include the vehicle being in a location in which operation of the engine leads to an increase in a concentration of exhaust gas in air surrounding the vehicle over time.

As an example, detecting that the vehicle is in the condition of reduced air exchange includes an indication of a loss of communication with a threshold number of GPS satellites. In another example, detecting that the vehicle is in the condition of reduced air exchange may be based on information pertaining to driving routes that are learned over time and stored at the controller. In other examples, one or more of vehicle-to-vehicle (V2V) and/or vehicle-to-infrastructures (V2I) communications may be relied upon for such detection.

In response to the response to the alert being received from the vehicle operator within the threshold duration, the engine may be operated to power the one or more loads external to the vehicle. Then, an increase in exhaust gas being inducted into the engine by way of an air intake passage to the engine while the engine is in operation may be monitored. In response to the increase in exhaust gas being inducted into the engine reaching a first threshold, the method may include notifying the vehicle operator that operation will be discontinued if action is not taken to mitigate the condition of reduced air exchange. In response to the increase in exhaust gas being inducted into the engine reaching a second threshold that is greater than the first threshold, the method may include discontinuing operation of the engine.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for controlling operation of an engine for powering external loads (referred to herein as power-to-the-box mode or PttB mode), particularly when it is determined that the engine is being operated in a space with limited air circulation, referred to herein as a condition of reduced air exchange. For example, a space with limited air circulation may include a garage (with the door closed or even open), or other enclosed or partially enclosed space. The condition of reduced air exchange as discussed herein pertains to a condition where operation of the engine may lead to an increased concentration of exhaust gas in air in a vicinity of the vehicle. For example, the vicinity of the vehicle may include air surrounding the vehicle. Additionally or alternatively the vicinity of the vehicle may comprise space within a predetermined distance from the vehicle in any direction. For example, the predetermined distance may include 10 feet or less, 20 feet or less, 30 feet or less, 40 feet or less, etc. The condition of reduced air exchange may comprise any situation where exhaust gas inducted into the engine by way of an air intake passage increases over time with engine operation. In other words, the condition of reduced air exchange includes situations where exhaust gas that is not purposely routed through an exhaust gas recirculation system to the engine, but instead is drawn into the engine as air is drawn into the engine, increases over time with continued engine operation. It may be understood that as the level of unmetered exhaust gas inducted into the engine increases, engine stability issues (e.g. hesitation, stall, knock, etc.) may be compromised which may in turn adversely affect power supplied to the power box.

Figure 1:
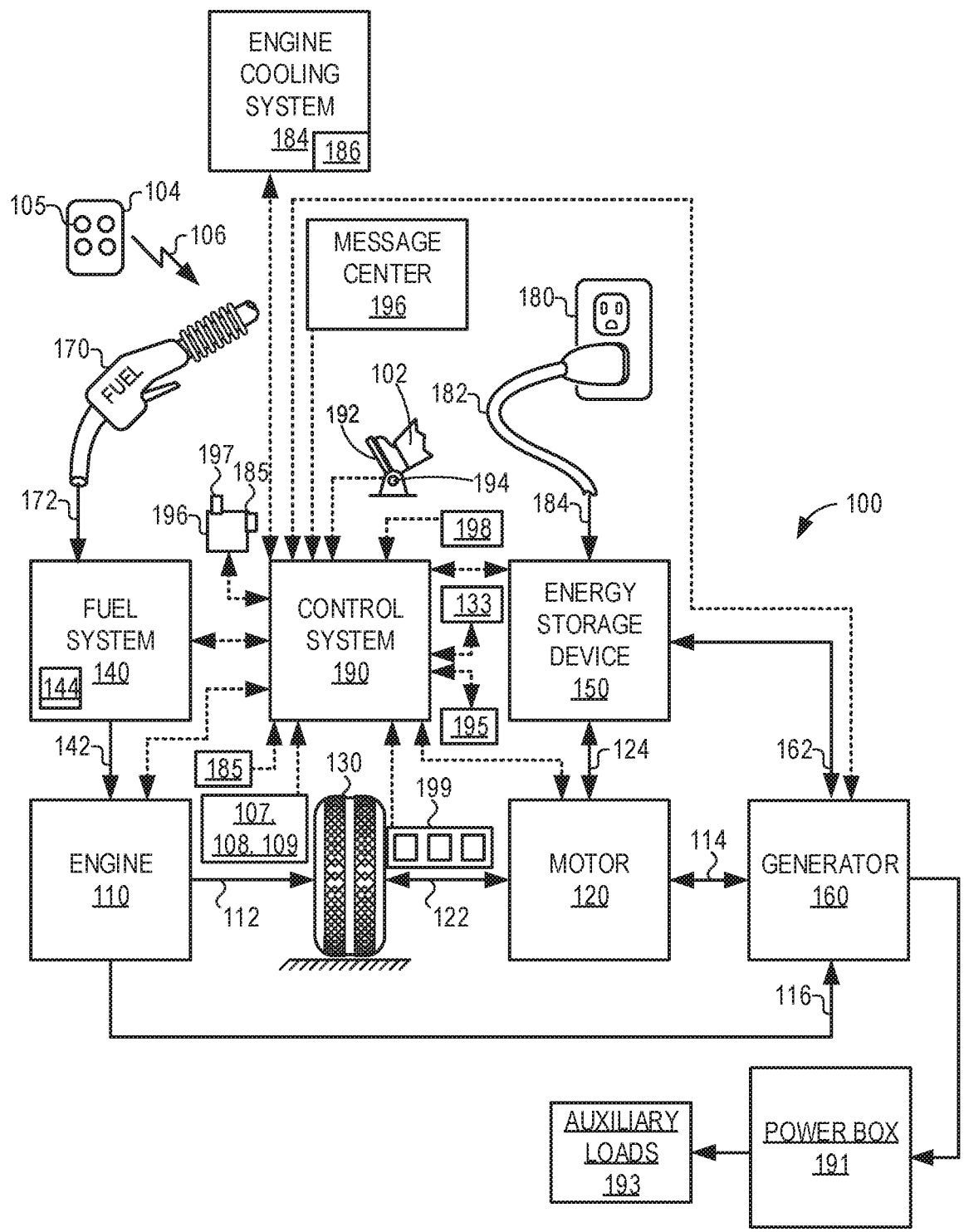
FIG. 1 schematically shows an example vehicle propulsion system.
Figure 2:
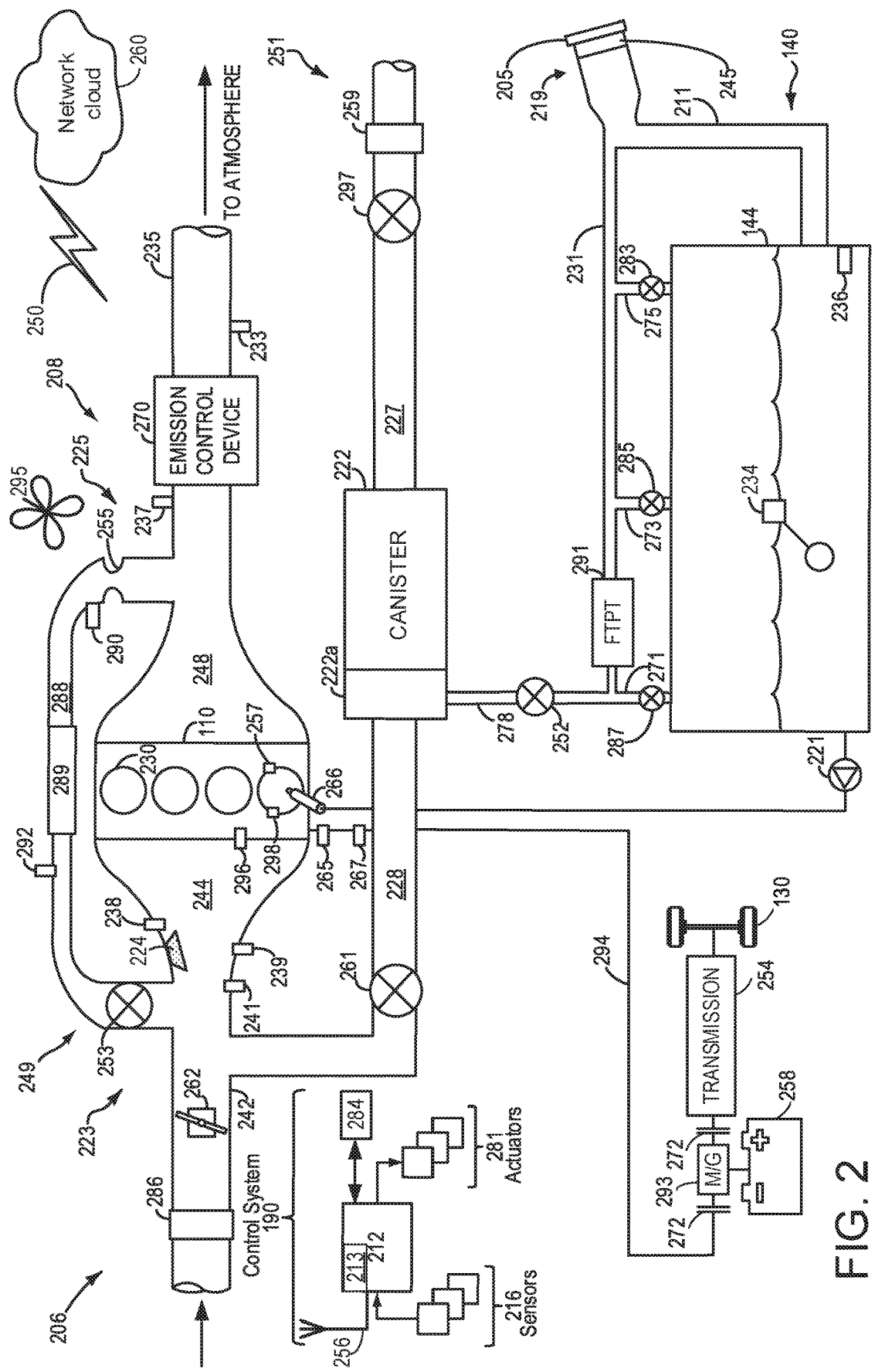
FIG. 2 schematically shows an example vehicle system with a fuel system, an evaporative emissions system, and an engine system that includes an EGR system.
Figure 3:
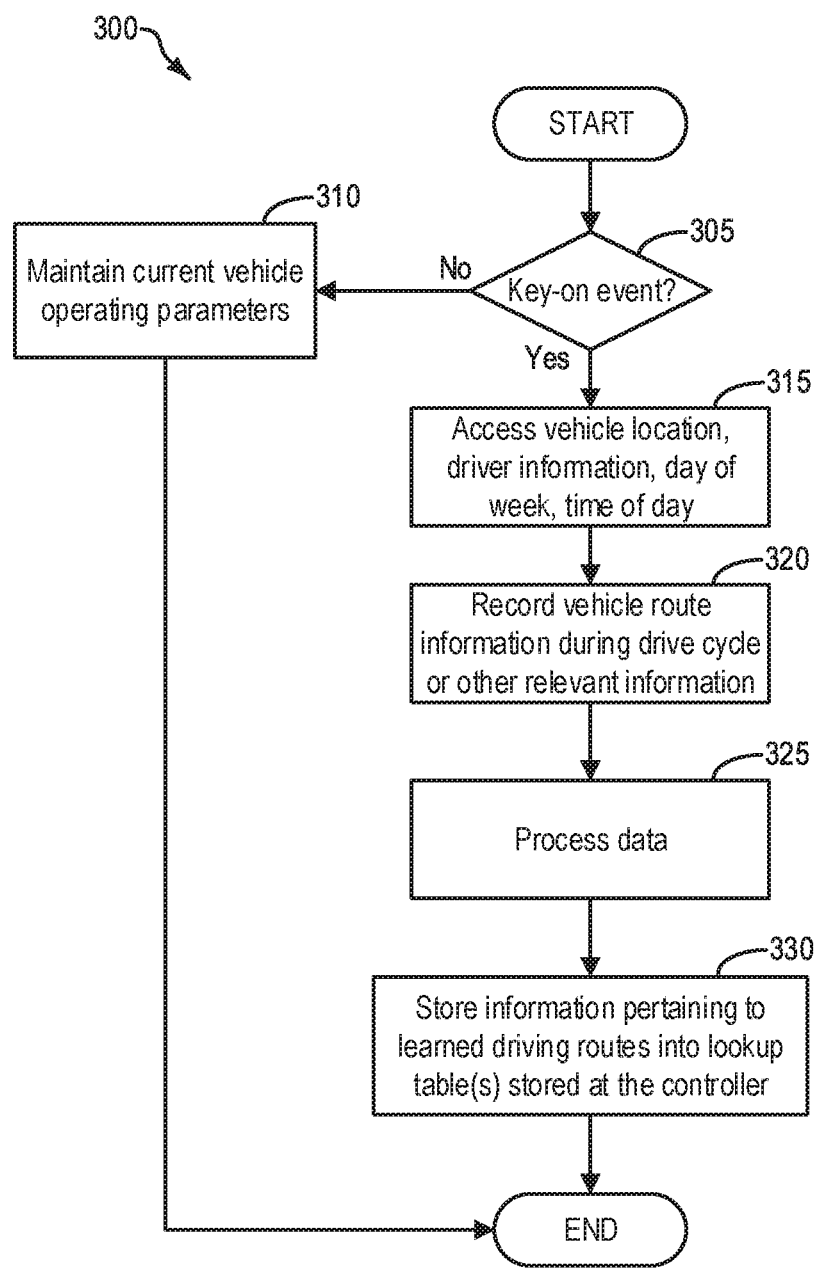
FIG. 3 depicts a high-level flowchart for an example method for learning when a PttB system is inferred to be used in a situation where unmetered EGR may be inducted into the engine.

Accordingly, discussed herein are vehicle systems that include an onboard power box that may receive power from engine operation, such as the vehicle system depicted at FIG. 1. Methodology discussed herein relates to assessing a level of unmetered exhaust gas recirculation (EGR) being inducted to the engine, and thus takes into account an amount of EGR being purposely inducted to the engine via an EGR system, as depicted at FIG. 2. In some examples, conditions of reduced air exchange may be indicated based on a loss of GPS satellite signals, vehicle-to-vehicle (V2V) and/or vehicle-to-infrastructure (V2I), and/or based on learned driving routines over time. Accordingly a methodology for learning driving routines is depicted at FIG. 3.

Figure 4:
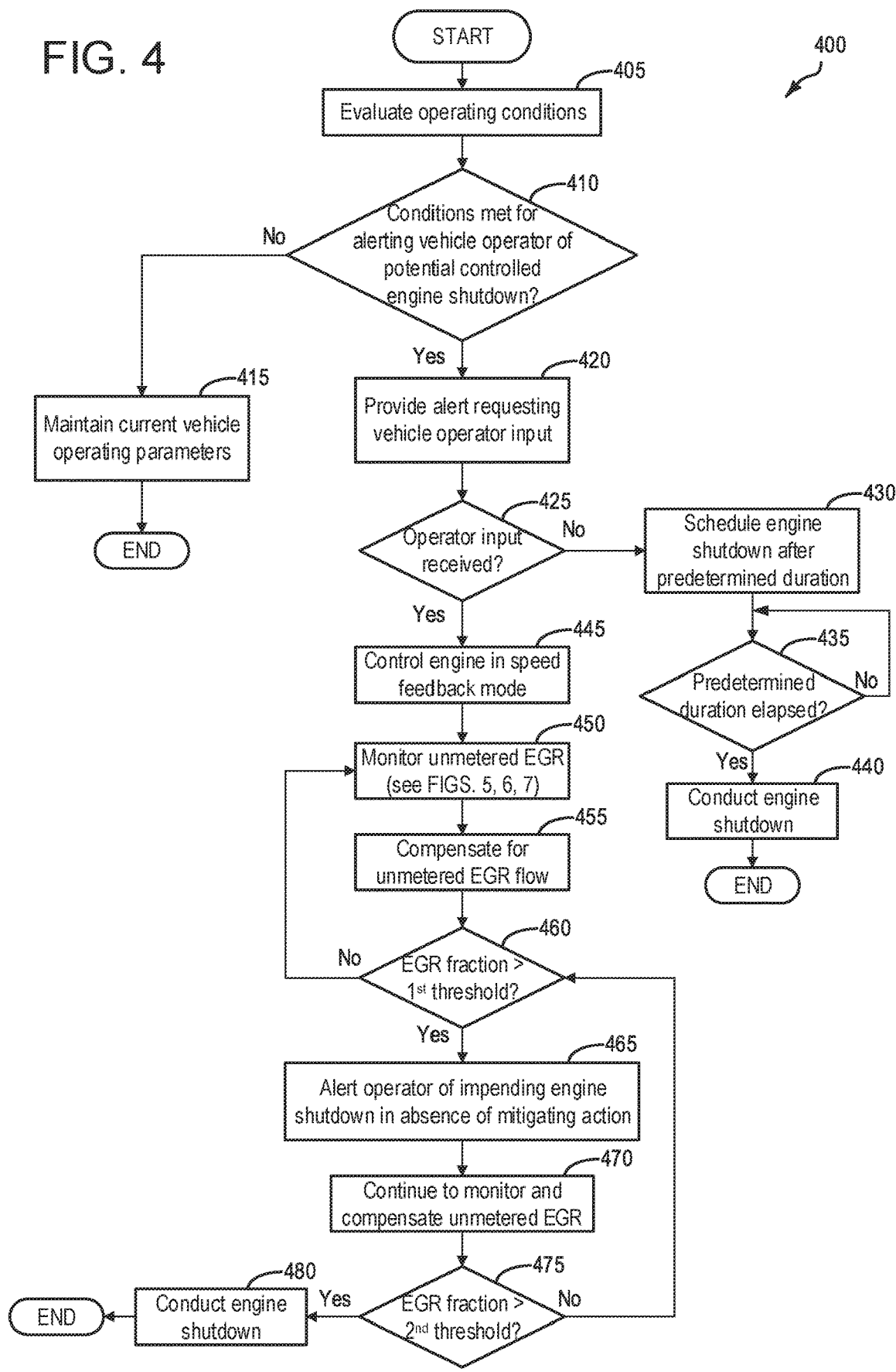
FIG. 4 depicts a high-level flowchart for an example method for controlling engine operation in response to an indication that the vehicle is operating in a PttB mode where it is inferred that unmetered EGR is being inducted into the engine.

Depicted at FIG. 4 is an example method for determining whether a request by a vehicle operator to operate the vehicle in PttB mode occurs in a condition of reduced air exchange. If so, a level of unmetered EGR being inducted to the engine may be determined by any one of the methodologies depicted at FIGS. 5-7. Based on the level of unmetered EGR, mitigating actions may be taken as per the method of FIG. 4 to control engine operation to account for such unmetered EGR. Such actions include one or more of controlling a duty cycle of an EGR valve, controlling spark timing, issuing visual and/or audible alerts to the vehicle operator of impending engine shutdown based on the determined level of unmetered EGR, etc. A timeline for controlling engine operation based on the method of FIGS. 4-7 is depicted at FIG. 8.

Figure 9:
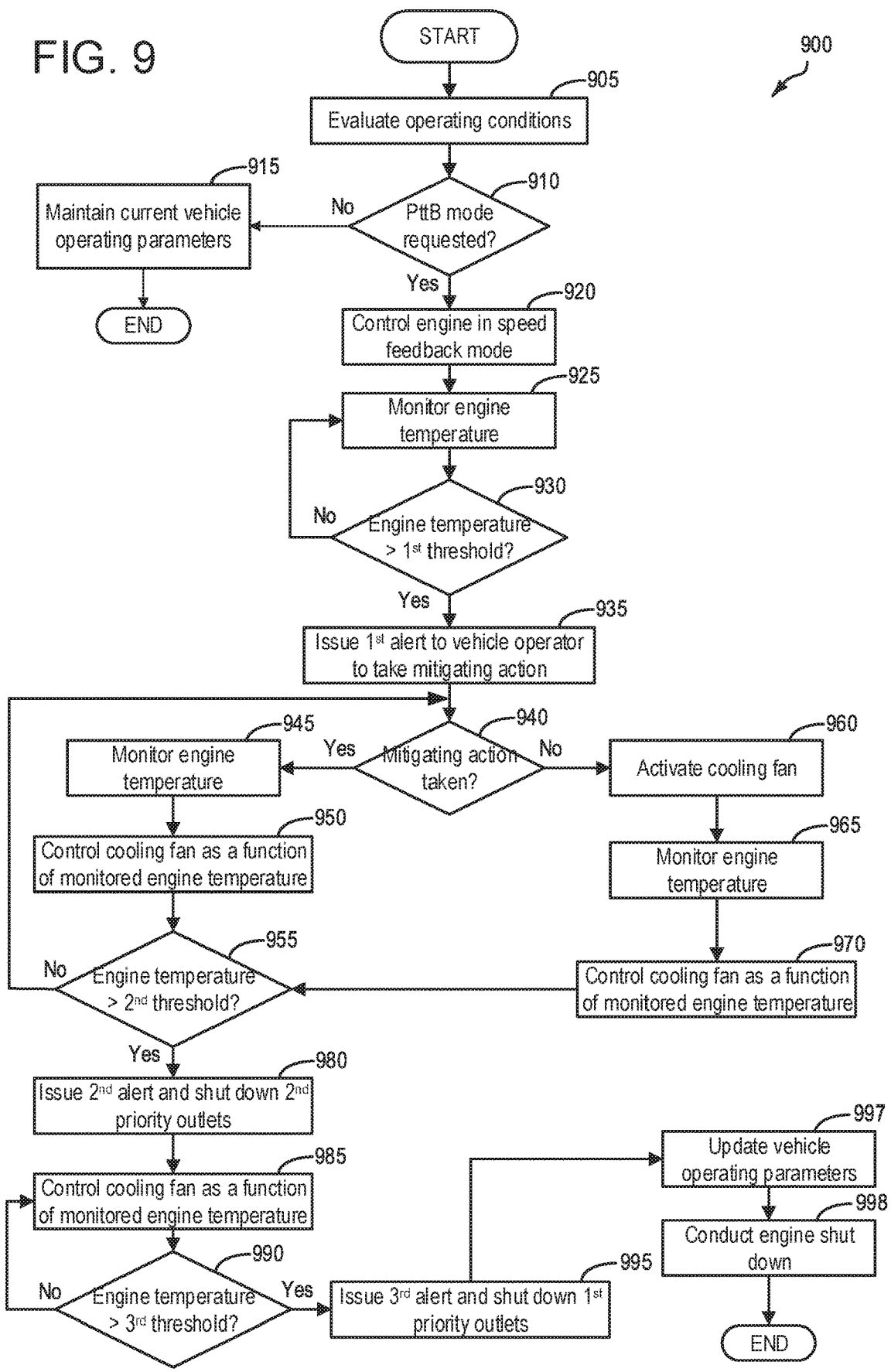
FIG. 9 depicts a high-level flowchart for an example method for monitoring engine temperature while the vehicle is being operated in PttB mode, and taking mitigating action in response the certain temperature thresholds being reached or exceeded.
Figure 10:
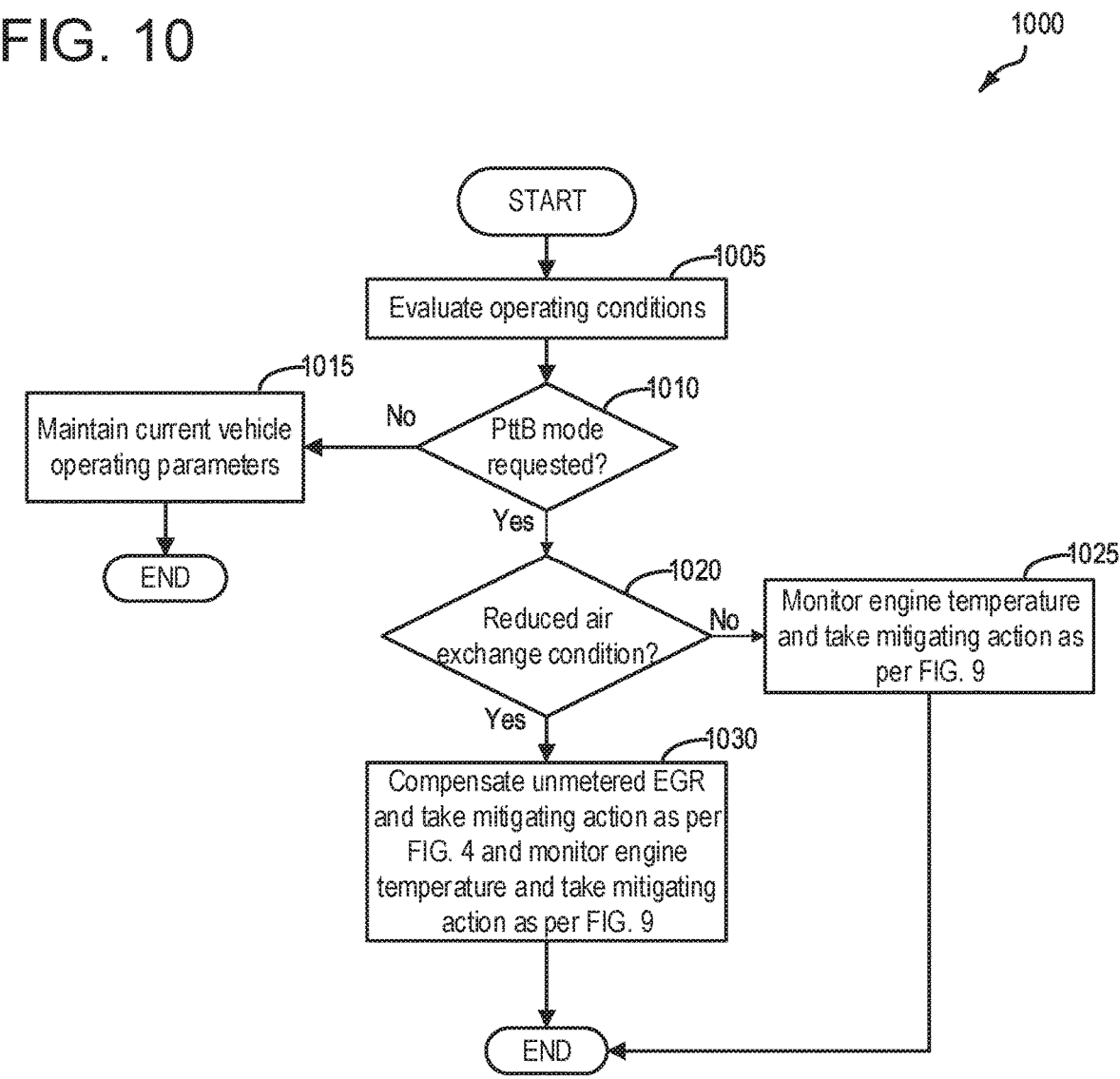
FIG. 10 depicts a high-level flowchart for an example method for controlling engine operation via the methods of FIG. 4 and FIG. 9.
Figure 11:
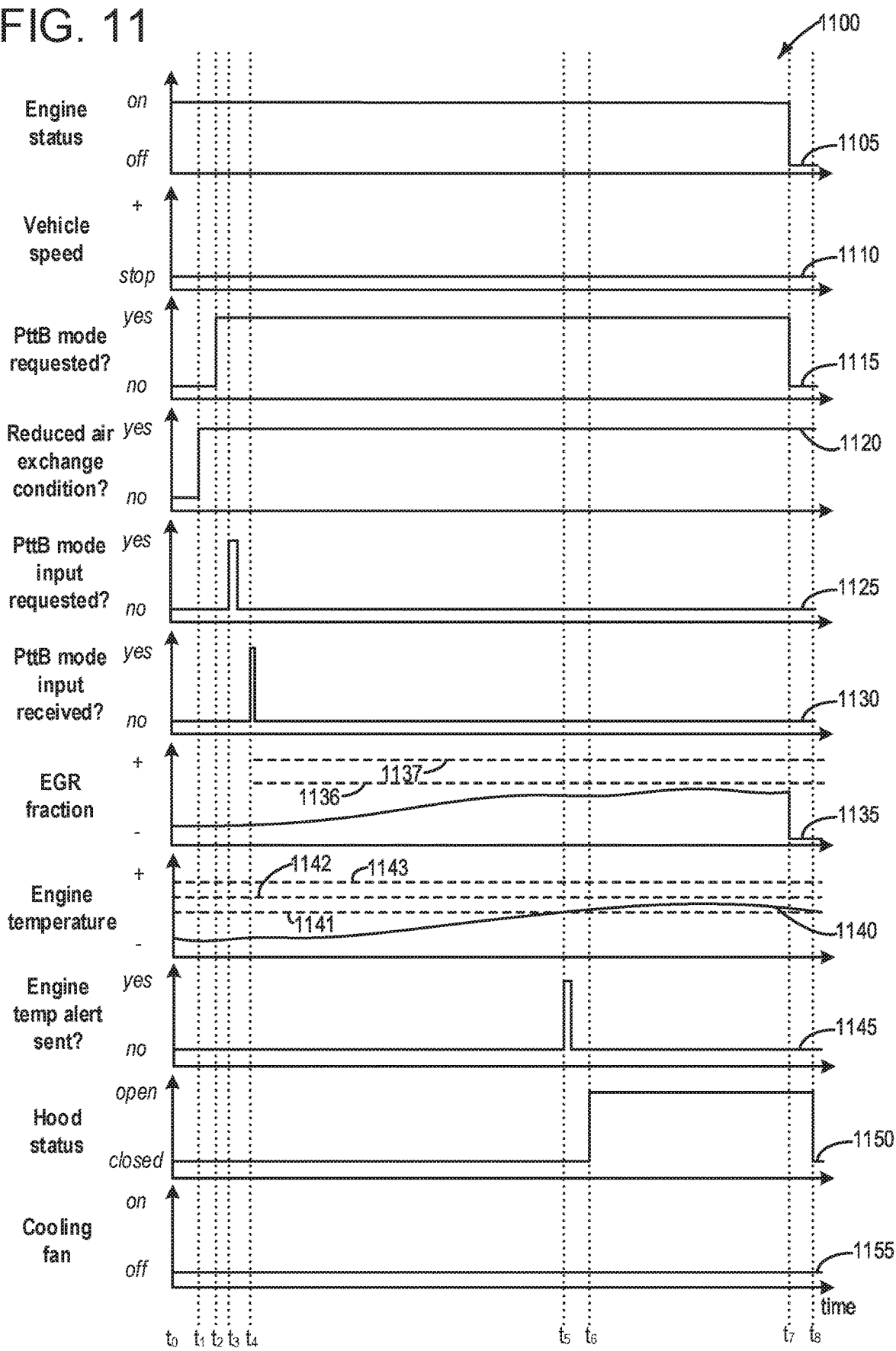
FIG. 11 depicts an example timeline for controlling engine operation according to FIG. 10.

It is further recognized that as engine temperature increases, power output to the power box (by way of a generator/alternator, etc.) may decrease. Accordingly, a further objective of the present disclosure is methodology for the monitoring of engine temperature and controlling engine operation and in turn, power box operation, as a function of engine temperature. Such a method is depicted at FIG. 9. The method of FIG. 9 may be used under situations where PttB mode is being used but not in a condition of reduced air exchange, or may alternatively be used when PttB mode is being used under conditions of reduce air exchange. Accordingly, FIG. 10 depicts an example method that takes into account the methods of FIGS. 4-7 and FIG. 9. An example timeline for controlling engine operation as per FIG. 10 is depicted at FIG. 11.

Figure 12:
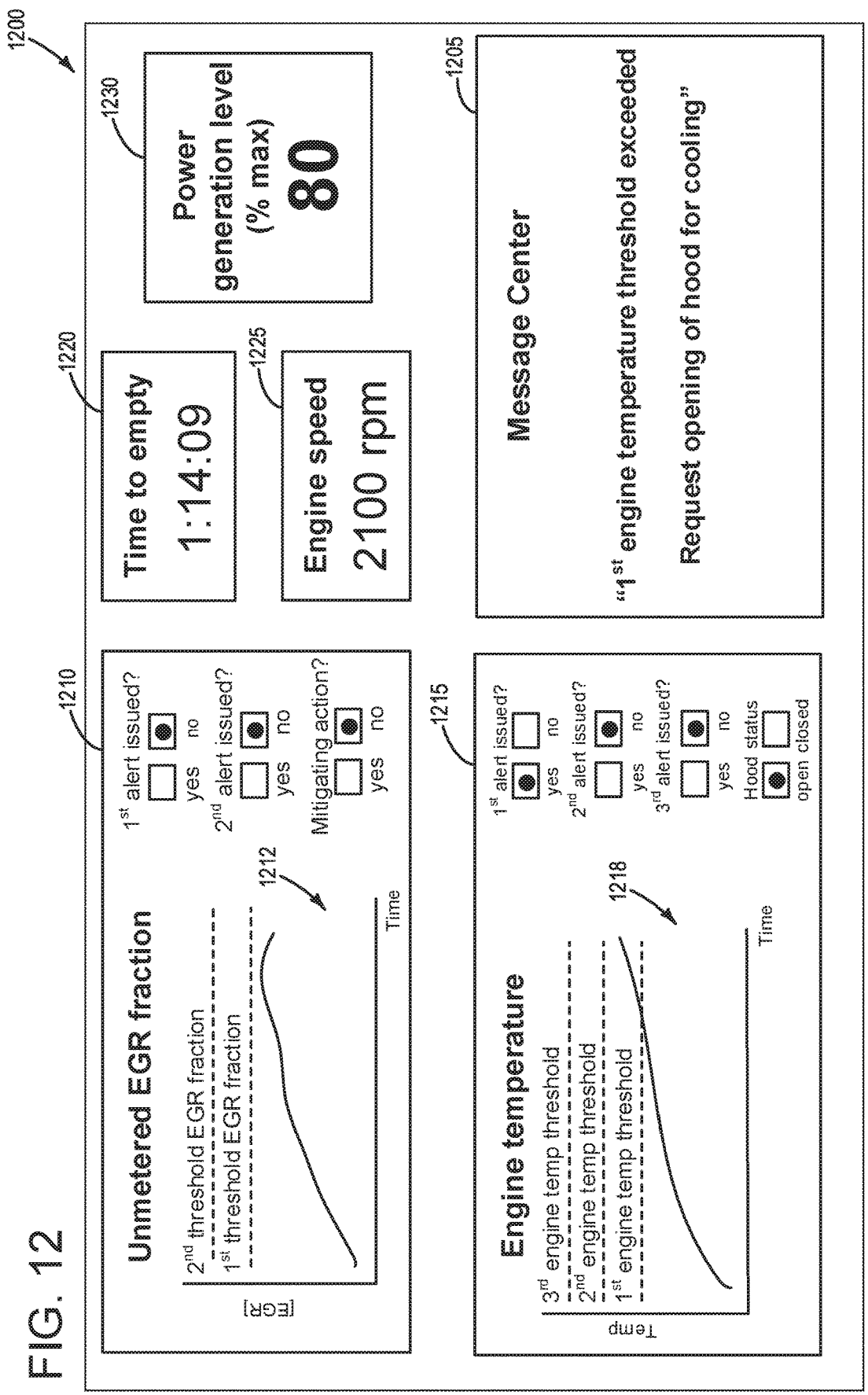
FIG. 12 depicts an example real-time display for communicating various parameters determined via the methods depicted herein to an operator of the vehicle.

Because one or more of unmetered exhaust being inducted to the engine and/or engine temperature may contribute to degradation of PUB mode (e.g. less efficient power supply to external loads, inconsistent power supply to external loads, etc.), it is herein recognized that it may be desirable to provide a vehicle operator access to a plurality of real-time parameters related to engine operation in PttB mode, including but not limited to level of unmetered exhaust gas being inducted to the engine, engine temperature, current power output from the power box, a "time-to-empty" indication for alerting a vehicle operator of how much time until the fuel tank runs out of fuel (as opposed to miles to empty, since the vehicle may be operating while stationary), engine speed, etc. Such real-time parameters may be determined via a controller of the vehicle and sent to a real-time display for viewing on a screen (e.g. Ford Sync screen) associated with a vehicle instrument panel and/or on a computing device used by the vehicle operator such as a smartphone, laptop, tablet, etc. For example, the real-time display may comprise a software application that communicates with the vehicle controller for updating the real-time parameters. Such a real-time display may further include a message center for alerting the vehicle operator when particular thresholds related to unmetered EGR, engine temperature, etc., have been reached or exceeded. An example of such a real-time display is depicted at FIG. 12.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Vehicle propulsion system 100 may include a power box 191 which may receive power from generator 160. Power box 191 may include one or more alternating current (AC) and/or direct current (DC) power outlets for performing tasks including but not limited to powering power tools at work sites, powering lighting, powering outdoor speakers, powering water pumps, supplying power in situations including emergency power outage, powering tailgating activities, powering RV camping activities, etc. In other words, the AC and/or DC power outlets of power box 191 may be used to power auxiliary electrical loads 193 (e.g. tools), for example loads external to the vehicle. The power outlets may be external to a cabin of the vehicle (e.g. bed of truck) and/or internal to the cabin of the vehicle.

Generator 160 may comprise an onboard full sine wave inverter. For providing power via power box 191, generator 160 may receive energy via the energy storage device 150 in some examples, where DC power is converted via the generator 160 to AC power for powering power box 191 under situations where AC power is desired. Additionally or alternatively, the engine 110 may be activated to combust air and fuel in order to generate AC power via generator 160 for powering power box 191. The vehicle operator 102 may utilize vehicle instrument panel 196, which may include input portions for receiving operator input, for controlling power box 191. Discussed herein, to power auxiliary electrical loads, the vehicle operator 102 may select a mode of operation via the vehicle instrument panel termed "power to the box" or PttB mode. For example, the vehicle operator may select PttB mode via the vehicle instrument panel, and may further select an engine speed (revolutions per minute or RPM) that the engine may run at for powering the power box 191.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. For example, control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal or an accelerator pedal. Furthermore, in some examples control system 190 may be in communication with a remote engine start receiver 195 (or transceiver) that receives wireless signals 106 from a key fob 104 having a remote start button 105. In other examples (not shown), a remote engine start may be initiated via a cellular telephone, or smartphone based system where a user's cellular telephone sends data to a server and the server communicates with the vehicle to start the engine.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (PHEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and sensors dedicated to indicating the occupancy-state of the vehicle, for example seat load cells 107, door sensing technology 108, and onboard cameras 109. Vehicle propulsion system 100 may also include inertial sensors 199. Inertial sensors may comprise one or more of the following: longitudinal, latitudinal, vertical, yaw, roll, and pitch sensors. The vehicle instrument panel 196 may include indicator light(s) and/or a text-based display in which messages are displayed to an operator. In some examples, vehicle instrument panel 196 may include a speaker or speakers for additionally or alternatively conveying audible messages to an operator. The vehicle instrument panel 196 may also include various input portions for receiving an operator input, such as buttons, touch screens, voice input/recognition (which may include a microphone), etc. As one example, the vehicle instrument panel 196 may include a refueling button 197 which may be manually actuated or pressed by a vehicle operator to initiate refueling. As another example, vehicle instrument panel may include a hood actuator 185, which when depressed, may actuate open a hood of the vehicle, thus allowing access to the engine 110. As will be discussed below, actuation of the hood actuator 185 may in some examples be in response to a request for increased air circulation with the engine for purposes of engine cooling. It may be understood that when the hood actuator is actuated to open the hood, a signal may be sent to the controller indicating the request to open the hood. In another example, when the hood is closed, another signal may be sent to the controller to indicate that the hood has been closed.

In some examples, vehicle system 100 may include lasers, radar, sonar, and/or acoustic sensors 133, which may enable vehicle location, traffic information, etc., to be collected via the vehicle. In one example, discussed in further detail below, one or more of sensors 133 may be used to infer a situation where the vehicle is in an environment of reduced air exchange (as compared to, for example, a situation where the vehicle is traveling on an open road or is parked outside).

Furthermore, vehicle system 100 may include an engine cooling system 184 for cooling engine 110, which may include an engine coolant temperature sensor 186 for inferring engine temperature.

Turning now to FIG. 2, it shows a schematic depiction of a vehicle system 206. The vehicle system 206 (which may be the same vehicle system as vehicle propulsion system 100 depicted at FIG. 1) includes an engine system 208 coupled to an emissions control system 251 and fuel system 140. Emission control system 251 includes a fuel vapor container or canister 222 which may be used to capture and store fuel vapors. In some examples, vehicle system 206 may be a hybrid electric vehicle system, as discussed above at FIG. 1.

The engine system 208 may include an engine 110 having a plurality of cylinders 230. The engine 110 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

An air intake system hydrocarbon trap (AIS HC) 224 may be placed in the intake manifold of engine 110 to adsorb fuel vapors emanating from unburned fuel in the intake manifold, puddled fuel from one or more fuel injectors with undesired fuel outflow, and/or fuel vapors in crankcase ventilation emissions during engine-off periods. The AIS HC may include a stack of consecutively layered polymeric sheets impregnated with HC vapor adsorption/desorption material. Alternately, the adsorption/desorption material may be filled in the area between the layers of polymeric sheets. The adsorption/desorption material may include one or more of carbon, activated carbon, zeolites, or any other HC adsorbing/desorbing materials. When the engine is operational causing an intake manifold vacuum and a resulting airflow across the AIS HC, the trapped vapors may be passively desorbed from the AIS HC and combusted in the engine. Thus, during engine operation, intake fuel vapors are stored and desorbed from AIS HC 224. In addition, fuel vapors stored during an engine shutdown can also be desorbed from the AIS HC during engine operation. In this way, AIS HC 224 may be continually loaded and purged, and the trap may reduce evaporative emissions from the intake passage even when engine 110 is shut down.

Engine system 208 may in some examples include an engine speed sensor 265. Engine speed sensor 265 may be attached to a crankshaft 294 of engine 110, and may communicate engine speed to the controller 212. Engine system 208 may in some examples include an engine torque sensor 267, and may be coupled to the crankshaft 294 of engine 110, to measure torque produced via the engine. In one example, the engine torque sensor may be utilized to indicate whether one or more engine cylinder(s) are functioning as desired, or if there engine misfire events, etc. Engine system 208 may in some examples include a knock sensor 296, which may function to sense vibrations caused by engine knock. Knock sensor 296 may comprise a piezoelectric crystal which produces a voltage as it vibrates.

Engine system 208 may also include an exhaust gas recirculation (EGR) system 249 that receives at least a portion of an exhaust gas stream exiting engine 110 and returns the exhaust gas to engine intake manifold 244 downstream of throttle 262. Under some conditions, EGR system 249 may be used to regulate the temperature and/or dilution of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing. EGR system 249 is shown forming a common EGR passage 288 from exhaust passage 235 to intake passage 242.

In some examples, exhaust system 225 may also include a turbocharger (not shown) comprising a turbine and a compressor coupled on a common shaft. The turbine may be coupled within exhaust passage 235, while the compressor may be coupled within intake passage 242. Blades of the turbine may be caused to rotate about the common shaft as a portion of the exhaust gas stream discharged from the engine 110 impinges upon the blades of the turbine. The compressor may be coupled to the turbine such that the compressor may be actuated when the blades of the turbine are caused to rotate. When actuated, the compressor may then direct pressurized fresh air to air intake manifold 244 where it may then be directed to engine 110. In systems where EGR passage 288 is coupled to engine exhaust 225 upstream of the turbine and coupled to intake passage 242 downstream of the compressor, the EGR system may be considered a high pressure EGR system. The EGR passage may additionally or alternatively be coupled downstream of the turbine and upstream of the compressor (low pressure EGR system). It may be understood that the systems and methods discussed herein may apply to a high pressure EGR system and/or a low pressure EGR system, without departing from the scope of this disclosure.

An EGR valve 253 may be coupled within EGR passage 288. EGR valve 253 may be configured as an active solenoid valve that may be actuated to allow exhaust gas flow into intake manifold 244. The portion of the exhaust gas flow discharged by engine 110 that is allowed to pass through EGR system 249 and return to engine 110 may be metered by the measured actuation of EGR valve 253, which may be regulated by controller 212. The actuation of EGR valve 253 may be based on various vehicle operating parameters and a calculated overall EGR flow rate.

One or more EGR coolers 289 may be coupled within EGR passage 288. EGR cooler 289 may act to lower the overall temperature of the EGR flow stream before passing the stream on to intake manifold 244 where it may be combined with fresh air and directed to engine 110. EGR passage 288 may include one or more flow restriction regions 255. One pressure sensor 290 may be coupled at or near flow restriction region 255. In some examples, another pressure sensor 292 may be coupled downstream of EGR cooler 289. The diameter of the flow restriction region may thus be used to determine an overall volumetric flow rate through EGR passage 288.

Fuel system 140 may include a fuel tank 144 coupled to a fuel pump system 221. The fuel pump system 221 may include one or more pumps for pressurizing fuel delivered to the injectors of engine 110, such as the example injector 266 shown. While only a single injector 266 is shown, additional injectors are provided for each cylinder. All the injectors in the example shown in FIG. 2 inject fuel directly into each cylinder (i.e., direct injection) rather than injecting fuel into or against an intake valve of each cylinder (i.e., port injection), however multiple fuel injector configurations are possible without departing from the scope of the present disclosure. It will be appreciated that fuel system 140 may be a return-less fuel system, a return fuel system, or various other types of fuel system. Fuel tank 144 may hold a plurality of fuel blends, including fuel with a range of alcohol concentrations, such as various gasoline-ethanol blends, including E10, E85, gasoline, etc., and combinations thereof. A fuel level sensor 234 located in fuel tank 144 may provide an indication of the fuel level ("Fuel Level Input") to controller 212. As depicted, fuel level sensor 234 may comprise a float connected to a variable resistor. Alternatively, other types of fuel level sensors may be used. In some examples, a temperature sensor 236 is positioned within fuel tank 144, to measure fuel temperature. Though only one temperature sensor 236 is shown, multiple sensors may be employed. In some examples, an average of the temperature values detected by those sensors can be taken to obtain a more precise measure of the temperature within the interior of the fuel tank 144. All such temperature sensors are configured to provide an indication of fuel temperature to controller 212.

Spark plugs 298 may be coupled engine cylinders 230, for providing spark for the in-cylinder combustion of air and fuel. While only one spark plug is depicted, it may be understood that additional spark plugs are provided for each additional cylinder.

Each of engine cylinders 230 may include a cylinder temperature sensor 257. Cylinder temperature sensor 257 may monitor cylinder head temperature, for example. While only one cylinder temperature sensor 257 is depicted, it may be understood that additional cylinder temperature sensor(s) may be provided for each additional cylinder. In some examples discussed herein, cylinder temperature sensor(s)

257 may be communicably coupled to breakers of outlets of the power box (e.g. 191). While the engine is being operated to power one or more outlets of the power box, when cylinder head temperature as monitored via the cylinder temperature sensor(s) 257 exceeds a predetermined temperature, outlets of a second priority as compared to outlets of a first priority may be shut off via the breaker. Then, if another higher predetermined temperature is reached as monitored via the cylinder temperature sensor(s) 257, the first priority outlets may be shut off via the breaker. It may be understood that the first priority outlets may be used to power items such as lighting, and computing devices (e.g. laptop, desktop computer, sensitive electronics equipment, etc.), while the second priority outlets may be used to power items such as compressors, saws, drills, etc. In other examples, an engine coolant temperature sensor (e.g. 186) may be relied upon for inferring a temperature of the engine. A cooling fan 295 may be positioned to direct an air flow at the engine for cooling purposes.

Vapors generated in fuel system 140 may be routed to an evaporative emissions control system 251 which includes a fuel vapor canister 222 via vapor recovery line 231, before being purged to the engine intake 223. Vapor recovery line 231 may be coupled to fuel tank 144 via one or more conduits and may include one or more valves for isolating the fuel tank during certain conditions. For example, vapor recovery line 231 may be coupled to fuel tank 144 via one or more or a combination of conduits 271, 273, and 275.

Further, in some examples, one or more fuel tank vent valves may be positioned in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 144 via a fuel filler pipe or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent, the canisters configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 140.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine.

Vent line 227 may also allow fresh air to be drawn into canister 222 when purging stored fuel vapors from fuel system 140 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve 297 coupled within vent line 227. When included, the canister vent valve may be a normally open valve, so that fuel tank isolation valve 252 (FTIV), if included, may control venting of fuel tank 144 with the atmosphere. FTIV 252, when included, may be positioned between the fuel tank and the fuel vapor canister within conduit 278. FTIV 252 may be a normally closed valve, that when opened, allows for the venting of fuel vapors from fuel tank 144 to canister 222. Fuel vapors may then be vented to atmosphere, or purged to engine intake system 223 via canister purge valve 261.

Controller 212 may comprise a portion of a control system 190. Control system 190 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, temperature sensor 236, intake manifold temperature sensor 239, pressure sensor 291, mass air flow (MAF) sensor 238, knock sensor 296, cylinder temperature sensor 257, and manifold air pressure (MAP) sensor 241. Exhaust gas sensor 237 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Other sensors such as pressure, temperature, and composition sensors may be coupled to various locations in the vehicle system 206. As another example, the actuators may include fuel injector 266, throttle 262, fuel tank isolation valve 252 (if included), canister vent valve 297, canister purge valve 261, and refueling lock 245. The control system 190 may include a controller 212. The controller may receive input data from the various sensors, process the input data, and trigger the actuators in response to the processed input data based on instruction or code programmed therein corresponding to one or more routines. Example control routines are described herein with regard to FIGS. 3-7 and FIGS. 9-10.

Vehicle system 206 may be a hybrid vehicle with multiple sources of torque available to one or more vehicle wheels 130. In the example shown, vehicle system 206 may include an electric machine 293. Electric machine 293 may be a motor or a motor/generator (e.g. 120 and/or 160). Crankshaft 294 of engine 110 and electric machine 293 are connected via a transmission 254 to vehicle wheels 130 when one or more clutches 272 are engaged. In the depicted example, a first clutch is provided between crankshaft 294 and electric machine 293, and a second clutch is provided between electric machine 293 and transmission 254. Controller 212 may send a signal to an actuator of each clutch 272 to engage or disengage the clutch, so as to connect or disconnect crankshaft 294 from electric machine 293 and the components connected thereto, and/or connect or disconnect electric machine 293 from transmission 254 and the components connected thereto. Transmission 254 may be a gearbox, a planetary gear system, or another type of transmission. The powertrain may be configured in various manners including as a parallel, a series, or a series-parallel hybrid vehicle.

Electric machine 293 receives electrical power from a traction battery 258 to provide torque to vehicle wheels 130. Electric machine 293 may also be operated as a generator to provide electrical power to charge traction battery 258, for example during a braking operation. In some examples, traction battery 258 may be the same as energy storage device 150 depicted above at FIG. 1. Alternatively, traction battery 258 may be different than energy storage device 150.

The controller 212 may be coupled to a wireless communication device 256 for direct communication of the vehicle system 206 with a network cloud 260. Using wireless communication 250 via the wireless communication device 256, the vehicle system 206 may retrieve data regarding current and/or upcoming ambient conditions (such as ambient humidity, temperature, pressure, etc.) from the network cloud 260. In one example, at completion of drive cycles, during drive cycles, and/or any time the vehicle is being operated, a database 213 within the controller 212 may be updated with information including driver behavioral data, engine operating conditions, date and time information, traffic information, traveled routes, requested modes of vehicle operation at particular locations (e.g. requests to enter PttB mode at particular locations) and time of day, etc.

Controller 212 may be communicatively coupled to other vehicles or infrastructures using appropriate communications technology, as is known in the art. For example, control system 190 may be coupled to other vehicles or infrastructures via wireless communication 250 which may comprise Wi-Fi, Bluetooth, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. The communication and the information exchanged between vehicles and/or infrastructures can be either direct between vehicles/infrastructures, or can be multi-hop. In some examples, longer range communications (e.g. WiMax) may be used in place of, or in conjunction with, V2V, V2I2V, etc., to extend the coverage area by a few miles. In still other examples, vehicle control system 190 may be in wireless communication 250 with other vehicles or infrastructures via network cloud 260 and the internet.

Vehicle system 206 may also include an on-board navigation system 284 (for example, a Global Positioning System). The navigation system 284 may include one or more location sensors for assisting in estimating vehicle speed, vehicle altitude, vehicle position/location, etc. For example, navigation system 284 may receive information from a number of satellites. As an example, navigation system 284 may record up to 12 GPS satellite signals, but in some examples may record more without departing from the scope of this disclosure. The number of GPS satellite signals recorded by navigation system 284 may be a function of vehicle location. For example, depending on vehicle location, any number of GPS satellite signals may become blocked. As will be discussed in further detail below, a loss of GPS satellite signals may be used to infer that the vehicle is in a location where, if the PttB mode is requested to be used via engine operation, the engine may end up ingesting unmetered EGR which may undesirably compromise engine operation, and thereby compromise the PttB mode of operation.

As discussed above, control system 190 may further be configured to receive information via the internet or other communication networks. Information received from the GPS may be cross-referenced to information available via the internet to determine local weather conditions, local vehicle regulations, etc. In some examples, information from the GPS may enable vehicle location information, traffic information, etc., to be collected via the vehicle.

Thus, discussed herein, a system for a vehicle may comprise an onboard navigation system. Such a system may further comprise a power box for supplying power to one or more loads external to the vehicle, where the power box includes outlets of varying priority including at least first priority outlets and second priority outlets and where operation of an engine supplies power to the power box. Such a system may further comprise a controller with computer readable instructions stored on non-transitory memory that, when executed, cause the controller to, with the vehicle stationary, receive a request to operate the engine to supply power to the power box. The controller may further, via the onboard navigation system, determine whether the vehicle is in a condition of reduced air exchange, and if so, issue an alert to an operator of the vehicle requesting input to the controller in order to proceed with operation of the engine. Responsive to the requested input being received, the controller may operating the engine to supply power to the power box and monitor for conditions of degraded power supply to the power box. The controller may selectively discontinue supplying power to the first priority outlets and the second priority outlets based on the conditions of degraded power supply to the power box.

For such a system, the system may further comprise one or more engine temperature sensor(s) for use in monitoring the conditions of degraded power supply to the power box as a function of engine temperature. In such an example, the controller may store further instructions to discontinue supplying power to the second priority outlets but not the first priority outlets when an engine temperature threshold is reached, and discontinue supplying power to the first priority outlets when another, greater engine temperature threshold is reached.

For such a system, the controller may store further instructions to monitor for the conditions of degraded power supply to the power box as a function of an increase in exhaust gas being inducted into the engine via an air intake passage to the engine while the engine is being operated to supply power to the power box and with the vehicle in the condition of reduced air exchange. In such an example, the controller may discontinue supplying power to the second priority outlets but not the first priority outlets when a first threshold exhaust gas recirculation fraction threshold is reached, and discontinue supplying power to the first priority outlets when a second threshold exhaust gas recirculation fraction threshold is reached, where the first threshold exhaust gas recirculation fraction threshold is lower than the second threshold exhaust gas recirculation fraction threshold.

Turning now to FIG. 3, a high level example method 300 for learning common driving routines driven in a vehicle, is shown. More specifically, method 300 may be utilized to learn common driving routes, and may further be utilized to learn/predict particular locations where it is likely that a vehicle operator will request PttB mode of vehicle operation. For example, method 300 may be used to obtain information related to day, time of day, and for how long PttB mode is requested for particular locations that the vehicle travels to. In some examples, method 300 may be used to learn particular locations where, if PttB mode is utilized, the engine may end up ingesting unmetered EGR due to a reduced air exchange in a vicinity of the vehicle.

Method 300 will be described with reference to the systems described herein and shown in FIGS. 1-2, though it should be understood that similar methods may be applied to other systems without departing from the scope of this disclosure. Method 300 may be carried out by a controller, such as controller 212 in FIG. 2, and may be stored at the controller as executable instructions in non-transitory memory. Instructions for carrying out method 300 and the rest of the methods included herein may be executed by the controller based on instructions stored on a memory of the controller and in conjunction with signals received from sensors of the engine system, such as the sensors described above with reference to FIGS. 1-2. The controller may employ actuators to alter states of devices in the physical world according to the methods depicted below.

Method 300 begins at 305 and may include indicating whether a key-on event is indicated. A key-on event may comprise an ignition key being utilized to start a vehicle either in an engine-on mode, or an electric only mode of operation. In other examples, a key-on event may comprise an ignition button on the dash, for example, being depressed. Other examples may include a key-fob (or other remote device including smartphone, tablet, etc.) starting the vehicle in either an engine-on mode, or an electric-only mode of operation. If, at 305, a key-on event is not indicated, method 300 may proceed to 310, and may include maintaining current vehicle operating parameters. For example, at 310, method 300 may include maintaining engine system, fuel system, and evaporative emissions system components in their current conformations and or current modes of operation. Method 300 may then end.

Returning to 305, responsive to a key-on event being indicated, method 300 may proceed to 315, and may include accessing vehicle location, driver information, day of the week (DOW), time of day (TOD), etc. A driver's identity (if a driver is present) may be input by the driver, or inferred based on driving habits, seat position, cabin climate control preferences, voice activated commands, etc. Vehicle location may be accessed via the onboard navigation system, for example via GPS, or other means such as via wireless communication with the internet.

Proceeding to 320, method 300 may include recording vehicle route information or other relevant information commencing from the key-on event. The vehicle controller may continuously collect data from various sensor systems and outside sources regarding the vehicle's operations/conditions, location, traffic information, local weather information, etc. The data may be collected by, for example, GPS (e.g. 284), onboard cameras (e.g. 109), etc. Other feedback signals, such as input from sensors typical of vehicles may also be read from the vehicle. Example sensors may include tire pressure sensors, engine temperature sensors, brake heat sensors, brake pad status sensors, tire tread sensors, fuel sensors, oil level and quality sensors, and air quality sensors for detecting temperature, humidity, etc. Still further, at 320, the vehicle controller may also retrieve various types of non-real time data, for example information from a detailed map, which may be stored in at the controller or which may be retrieved wirelessly.

As one example, data acquired by the controller at 320 may include information on whether PttB mode is requested via the vehicle operator when at or near particular locations. The data may include what time of day (and what day of week/month) the PttB mode is requested, and may further include how long the particular PttB mode request lasts. In other words, the duration of the PttB mode may be obtained. In some examples, the data may include information pertaining to whether unmetered EGR is inferred to be ingested into the engine while the vehicle is operated in PttB mode at or near a particular location. As discussed herein, it may be understood that unmetered EGR comprises exhaust gas that is inducted into the engine by way of the intake passage (e.g. 242), where the unmetered EGR is introduced into the intake passage upstream of the throttle (e.g. 262). In contrast, EGR as discussed herein that is introduced into the intake manifold (e.g. 244) by way of the EGR system (e.g. 249) and under control of the EGR valve (e.g. 253) may be understood to comprise metered EGR.

More specifically, unmetered EGR may be ingested into the engine under circumstances of reduced air exchange in a vicinity of the vehicle, such as may occur when the vehicle is operating in PttB mode in an enclosed space, for example. In such an example, it may be understood that upon the vehicle entering into such a location of reduced air exchange, a reduction in GPS satellite signals may result. Thus, via the methodology of FIG. 3, the controller may learn particular locations where the vehicle is inferred to have entered into a location where reduced air exchange is likely or expected, and where it is likely that the vehicle will be requested to be operated in PttB mode. Accordingly, in such examples, in response to the PttB mode being requested where the PttB mode relies on engine operation, engine operation may be controlled as discussed in further detail below with regard to the methods of FIGS. 4-7, to avoid undesirable issues related ingestion of unmetered EGR while operating in PttB mode in the location of reduced air exchange.

Accordingly, data regarding particular vehicle driving routes or other relevant information (e.g. locations of reduced air exchange where PttB mode is regularly requested) may be obtained and stored at the vehicle controller. Proceeding to 325, method 300 may include processing the obtained data to establish predicted/learned driving routes, and may further include processing the data to establish particular geographical locations where PttB mode is often requested under circumstances of reduced air exchange.

For example, numerous trip vectors and corresponding information may be obtained and stored at the vehicle controller, such that predicted/learned driving routes and associated actions (e.g. requested PttB mode of operation) may be achieved with high accuracy. In some examples, a vehicle may travel route(s) that are not frequently traveled (e.g. not "common"). Thus, it may be understood that route information that is not correlated significantly with commonly driven routes may be periodically forgotten, or removed, from the vehicle controller, in order to prevent the accumulation of exorbitant amounts of data pertaining to vehicle travel routines.

In some examples data collected from the vehicle travel routines including GPS data may be applied to an algorithm that feeds into one or more machine learning algorithms to determine common vehicle travel routes and other relevant information (e.g. PttB mode requests and whether such requests coincide with engine operation in a location of reduced air exchange).

Thus, learning driving routes at 325 may include determining particular driving routes (or key-on events where the vehicle is not driven) associated with PttB usage requests. As one example, a vehicle operator may drive the vehicle to a job site, and may request PttB mode in a fairly regularly fashion at the particular job site. Thus, the controller may process data associated with acquired information related to the particular job site and PttB mode requests, to establish whether it is likely that the PttB mode will be requested under circumstances of reduced air exchange in a vicinity of the vehicle, which may lead to engine ingestion of unmetered EGR.

Such likelihoods may in some examples comprise several different confidence estimations. For example, it may be highly likely that given a particular location the vehicle is at, that PttB mode will be requested under circumstances of reduced air exchange in the vicinity of the vehicle. In other examples, there may be a medium or low likelihood that, given a particular location of the vehicle, that PttB mode will be requested under circumstances of reduced air exchange in the vicinity of the vehicle. The likelihoods may be based on empirically-acquired data. For example, the more times that a vehicle operator requests PttB mode under circumstances of reduced air exchange at a particular location, the higher the likelihood that when the vehicle is at such a location, PttB mode will be requested. Such likelihoods may be used along with the methods of FIGS. 4-7, to control engine operation under such circumstances as will be discussed in further detail below.

Proceeding to 330, method 300 may include storing the information discussed pertaining to learned driving routes and PttB mode requests into one or more lookup table(s) at the vehicle controller. Such lookup tables may be utilized to indicate whether it is likely that a particular vehicle location is likely to correspond to a PttB mode request under circumstances of reduced air exchange.

Accordingly, turning now to FIG. 4, a high-level example method 400 for controlling engine operation in situations where PttB mode is requested and where it is further inferred that the vehicle is in a location of reduced air exchange, is shown. More specifically, method 400 may be used to, in response to an indication of engine operation under conditions of inferred reduced air exchange, request input from the operator as to whether such engine operation is desired to be continued. In absence of such operator input, the engine may be controlled to be shut down under control of the vehicle controller, whereas in response to such operator input, engine operation may continue where unmetered EGR ingested into the engine may be monitored and compensated for. In response to an amount of unmetered exhaust gas being indicated to be ingested to the engine that exceeds a first threshold, an alert may be provided to the vehicle operator, indicating that the engine will be shutdown unless mitigating action is taken. Then, in the absence of such mitigating action, in response to the unmetered exhaust gas being indicated to be ingested to the engine exceeding a second threshold amount, the engine may be controlled to be shut down under control of the vehicle controller. It may be understood that controlling engine shut down may include discontinuing the providing of fuel and spark to engine cylinders.

Method 400 will be described with reference to the systems described herein and shown in FIGS. 1-2, though it should be understood that similar methods may be applied to other systems without departing from the scope of this disclosure. Method 400 may be carried out by a controller, such as controller 212 in FIG. 2, and may be stored at the controller as executable instructions in non-transitory memory. Instructions for carrying out method 400 and the rest of the methods included herein may be executed by the controller based on instructions stored on a memory of the controller and in conjunction with signals received from sensors of the engine system, such as the sensors described above with reference to FIGS. 1-2. The controller may employ actuators such as spark plug(s) (e.g. 298), fuel injector(s) (e.g. 266), EGR valve (e.g. 253), etc., to alter states of devices in the physical world according to the methods depicted below.

Method 400 begins at 405, and includes estimating and/or measuring vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Proceeding to 410, method 400 may include indicating whether conditions are met for alerting a vehicle operator of a potential controlled engine shutdown. Conditions being met at 410 may include one or more of the following. In one example, conditions being met at 410 may include an indication that a speed of the vehicle is below a threshold vehicle speed (e.g. stopped or stationary) where the engine is in operation combusting air and fuel and where it is indicated that the vehicle is in a location of reduced air exchange. In such an example, and any other example relying on an indication of the vehicle being in a location of reduced air exchange, it may be understood that such an indication may include a decrease in GPS satellite signals either as the vehicle is coming to a stop or after the vehicle has stopped. As one example, if 12 GPS satellite signals are indicated via the onboard navigation system, and that number is reduced by a threshold number (e.g. reduced by three or more GPS signals) as the vehicle is coming to a stop or after the vehicle has stopped, then a condition of reduced air exchange may be indicated. Additionally or alternatively, such an example of the vehicle being in a location of reduced air exchange may be provided via route learning methodology as discussed above with regard to FIG. 3. More specifically, based on learned routes commonly traveled by the vehicle, it may be inferred as to whether the vehicle has entered into a condition of reduced air exchange.

In still another example, detecting that the vehicle is in a location of reduced air exchange may involve communication between the vehicle and other vehicles or infrastructures via V2V and/or V2I communications. For example, the vehicle may, via the controller, initiate a query as to whether the vehicle is in a condition of reduced air exchange, and may receive a response from one or more vehicles and/or infrastructures as to whether the vehicle is in a location of reduced air exchange or not.

Conditions being met at 410 may additionally or alternatively include an indication of a request for operating the vehicle in PttB mode where power to the power box is supplied by the engine, and further in response to an indication that the vehicle is in a location of reduce air exchange, as discussed above. For example, the vehicle operator may request PttB mode through a screen associated with the vehicle instrument panel, via a particular actuator (e.g. button) associated with the vehicle instrument panel and specific for communicating the request for PttB operation to the controller, etc. As another example, conditions being met at 410 may include an indication that vehicle speed has remained below the threshold vehicle speed (e.g. stopped) for a predetermined duration of time with the engine operating and/or with PttB mode requested and further in response to an indication that the vehicle is in a condition of reduced air exchange. If, at 410, such conditions are not indicated to be met, method 400 may proceed to 415. At 415, method 400 may include maintaining current vehicle operating parameters. For example, if the engine is in operation combusting air and fuel, such operation may be maintained. Alternatively, if the vehicle is being propelled via electrical energy, then such operation may be maintained. In an example where PttB mode is requested/in operation but where conditions are not met for alerting the vehicle operator of a potential controlled engine shutdown, then PttB mode may be continued such that power to external loads may go uninterrupted. Method 400 may then end.

Returning to 410, in response to conditions being met for alerting the vehicle operator of a potential controlled engine shutdown, method 400 may proceed to 420. At 420, method 400 may include providing such an alert, where such an alert further includes a request for vehicle operator input. Said another way, such an alert may include a message communicated to the vehicle operator that the vehicle may be operating in a condition of reduced air exchange, and may further include a request for vehicle operator input in order to maintain or continue such operation. Such a message may further include an indication that the engine will be scheduled to be shut down if such operator input is not received within a threshold duration (e.g. within 3 minutes or less, within 2 minutes or less, within 1 minute or less, etc.).

Examples of such a message may include a message communicated via the vehicle instrument panel (e.g. 196) in the form of a text-based message. As one example, there may be a separate screen (e.g. Ford Sync screen) associated with the vehicle instrument panel, which may be used for providing such a message. In another example, such a message may comprise an audible message, communicated under the control of the controller and via one or more speaker(s) associated with the vehicle instrument panel. In such an example, the controller may string together a number of key words or phrases stored at the controller as a table, to generate the audible message. Such an audible message may be provided in addition to or alternative to the text-based message via the instrument panel.

In another example, such a message may additionally or alternatively comprise a text message sent to a software application used by the vehicle operator (e.g. smart phone application, tablet application, etc.), and/or a text message sent to the vehicle operator's phone (e.g. smart phone).

In still other examples, such a message may additionally or alternatively include the controller of the vehicle commanding a particular sequence of horn honking (e.g. five honks in rapid succession, etc.) and/or particular sequence of exterior and/or interior light flashing. Other audible alerts are within the scope of this disclosure.

Subsequent to providing such an alert at 420, method 400 may proceed to 425, where it is determined as to whether operator input in response to the alert, has been received. Operator input being received may include one or more of the following examples. One example may include the vehicle operator pressing one of the accelerator pedal or the brake pedal in a particular pattern. In another example, operator input being received may include the vehicle operator first pressing the accelerator pedal, then the brake pedal (or vice versa) in a particular predetermined alternating sequence. Other examples may include the vehicle operator pressing a button associated with an electric seat (which may include pressing the button in a particular identifiable sequence), pressing a particular button associated with a door of the vehicle (which may include pressing the button in a particular identifiable sequence), pressing one or more buttons associated with a steering wheel of the vehicle (which may include pressing the one or more buttons in a particular identifiable sequence), interacting with a touch screen (e.g. Ford Sync screen), associated with the vehicle instrument panel, responding to a text message that includes the alert requesting vehicle operator input, responding via the software application discussed above, or via any other wireless communication system that may communicatively coupled to the controller of the vehicle and configured to receive such a response.

As discussed above, if such operator input has not been received within a threshold duration (e.g. within 3 minutes or less, within 2 minutes or less, within 1 minute or less, etc.), then the engine may be controlled to be shut down. In another example where PttB mode has been requested and one or more external loads are plugged into the power box, if the one or more loads are unplugged prior to the threshold duration elapsing, then the engine may be controlled to be shut down in the absence of vehicle operator input in the form described above. In other words, the unplugging of the one or more external loads may serve as an indication that the vehicle operator does not want to continue with PttB mode given the alert, and thus the engine may be shut down. It may be understood that such shutting down of the engine may occur when all external loads are unplugged from the power box.

Accordingly, in such a case where operator input is not received (or when all external loads are unplugged prior to the threshold duration elapsing), method 400 may proceed to 430. At 430, method 400 may include discontinuing engine operation after a predetermined duration of time elapses. The predetermined duration of time may allow for the vehicle operator to respond and avert the engine shutdown, in the event that the vehicle operator desires engine operation to continue but did not respond in the time allotted at step 425. In some examples, the predetermined duration of time at 430 may comprise 15 seconds, 30 seconds, 45 seconds, 1 minute, etc.

Accordingly, proceeding to 435, method 400 may include indicating whether the predetermined duration (after which the engine will be shut down), has elapsed. If not, method 400 may continue to determine if there is operator input, and if not and the predetermined duration elapses, then method 400 may proceed to 440, where engine shutdown may be conducted. Specifically, engine shutdown may include the vehicle controller commanding fuel injectors (e.g. 266) to stop providing fuel to engine cylinders, and may further include discontinuing providing spark to engine cylinders. Method 400 may then end. It may be understood that, while not specifically shown in the flow description stemming from 435, in a case where the predetermined duration has not yet elapsed and where vehicle operator input is received, method 400 may return to 425.

Returning to 425, in response to vehicle operator input having been received as discussed, and further in response to PttB mode being requested, method 400 may proceed to 445. At 445, method 400 may include controlling the engine in speed feedback mode where engine speed is held substantially constant and where load on the engine is determined from a total torque load on the engine from one or more sources. Other feedback modes for operating in PttB mode are within the scope of this disclosure.

Potential load sources contributing to the total torque load may include engine pumping friction due to operation of an engine oil pump, and a transmission oil pump, provided the transmission oil pump is driven from the engine. Another potential load source may comprise front end accessory drive (FEAD) loads. Examples of FEAD loads may comprise a 12V alternator, if present, and in some examples a higher voltage BISG, if present. In some examples, FEAD load may comprise a 12V or 24V (or higher voltage) alternator or BISG used to support PttB electrical loads. Another example of FEAD load may comprise a water pump, provided the pump is mechanically driven, and an AC compressor load, provided the compressor is mechanically driven.

In some examples, the vehicle may be equipped with a CISG. In such examples, CISG load may contribute to the total torque load when the vehicle is operating in PttB mode.

In one example, the CISG may be connected to a crankshaft output through a disconnect clutch and the CISG may run at a same speed as the crankshaft output, or in other examples may run at a higher speed resulting from gearing between the disconnect clutch output and the CISG input. In a case where the disconnect clutch is employed, when the disconnect clutch is not locked, for example if a slip across the disconnect clutch is greater than zero, torque load applied to the engine by the disconnect clutch may be a function of an applied clutch pressure. Alternatively, in another example, under situations where the disconnect clutch is locked, or in other words, has zero slip, the torque load applied to the engine may be a function of a CISG charging torque plus any additional load on the CISG output, for example a mechanical transmission oil pump torque provided such a pump is driven off the CISG.

As part of an engine calibration process prior to the vehicle being used by the vehicle operator, an engine fresh air charge (e.g. air charge without any additional EGR), may be mapped as a function of operating load and speed in a dynamometer test cell. For vehicles equipped with an EGR system (e.g. 249 depicted at FIG. 2), EGR and spark timing may be swept at the load and speed points mentioned above, in order to determine a maximum EGR that the engine may operate at such load and speed points, at as well as spark timing at such load and speed points that delivers a desired combination of fuel economy and combustion stability. Specifically, it may be understood that EGR is introduced to the engine for the purposes of at least 1) increasing intake manifold pressure thus reducing engine pumping loss (which may reduce fuel consumption), and 2) adding burned gas to the cylinder air charge which may reduce cylinder combustion temperatures and thereby reduce NOx emissions, particularly under situations where the EGR system includes a cooler (e.g. 289) to reduce EGR gas temperature.

On an operating engine with an EGR system, discussed in regard to the method of FIG. 4, an EGR measurement system may be used to calculate an EGR mass flow rate ($m_{egr}$), in real-time. This EGR mass flow rate may then be subtracted from a total air charge mass flow rate ($m_{tac}$), to determine a fresh air flow rate ($m_{fac}$), which may then be used in an open loop engine fuel mass injection calculation and an engine torque calculation.

For a given engine load (e.g. the load, or torque that the engine is supporting) and engine speed, there may be a mapping to the fresh air mass flow rate as determined in dynamometer testing. A gas engine combustion torque for a 720 crank angle (CA) degree cycle may be given as:

$$\text{Torque} = m_f n_f * Q_{HV}/(4\pi) \quad \text{(Eq. 1)}$$

$$m_f = m_{fac}(A/F) \quad \text{(Eq. 2)}$$

$$m_{tac} = P_{man}(n_v * V_d/R * T_{man}) \quad \text{(Eq. 3)}$$

$$m_{tac} = m_{fac} + m_{egr} \quad \text{(Eq. 4)}$$

$$m_{tac\_th} = m_{fac} + m_{egr\_th} \quad \text{(Eq. 5)}$$

$$m_{egr} = m_{egr\_th} + m_{egr\_meas} \quad \text{(Eq. 6)}$$

For the above equations 1-6:
$n_f$=fuel conversion efficiency
$n_v$=volumetric efficiency
$Q_{HV}$=combustion heating value
$m_f$=mass of fuel injected over the 720 CA degree cycle, in Kg
$m_{fac}$=mass of fresh air inducted into the cylinders, or air charge, over the 720 CA degree cycle, in Kg $m_{tac}$=mass of total air mass (fresh air plus EGR) inducted into the cylinders, or in other words, total air charge, over the 720 CA degree cycle, in Kg $M_{tac\_th}$=mass of total air mass (fresh air plus EGR) inducted into the intake manifold from the throttle, over the 720 CA degree cycle, in Kg $m_{egr}$=mass of EGR inducted into the cylinders over the 720 CA degree cycle, in Kg $m_{egr\_th}$=mass of EGR inducted into the intake manifold from the throttle, over the 720 CA degree cycle, in Kg $M_{egr\_meas}$=measured mass of EGR inducted into the intake manifold from the EGR system, over the 720 CA degree cycle, in Kg (A/F)=fresh air to fuel mass ration of the engine (which may be controlled to a constant desired value, for example near 14.7, based on feedback from exhaust gas sensor(s) (e.g. UEGO or HEGO feedback)

$P_{man}$=intake manifold air pressure, in PA $T_{man}$=intake manifold air temperature, in Kelvin $V_d$=engine displaced volume (meters cubed)

R=gas constant (287.058 in J/(Kg deg K)

Thus, while operating in PttB mode with the vehicle stationary, and where PttB AC current load is substantially constant or slowly changing, UEGO/HEGO-based closed loop fuel system control may be used to determine average injected fuel mass, and the engine speed feedback control system may increase or decrease commanded engine torque to maintain commanded engine speed. Furthermore, while in stationary PttB mode, a variable cam timing (VCT) system for the engine (where equipped) may map cams to positions which deliver a optimal combination of minimum fuel consumption and combustion stability.

For a gasoline engine running at a fixed A/F ratio (e.g. stoic), and for a given or fixed CAM timing, engine output torque may be a function of fresh air mass flow rate and spark timing. For an engine that has an EGR system (e.g. 249), spark timing may be advanced as measured EGR increases, to compensate for an increase in cylinder combustion burn duration due to the increase in measured EGR, as is commonly understood in the art.

Thus, in a situation as discussed with regard to method 400 where it is inferred that the vehicle is operating in a condition of reduced air exchange, an EGR fraction of air in the vicinity of the vehicle may increase over time. Once the EGR value reaches a particular value (e.g. 30%), fuel may not be completely burned, which may lead to a reduction in engine combustion torque. While, as mentioned above, spark advance may be used to maintain the combustion pressure peak close to a desired value (e.g. 10 CA degrees after top dead center, or TDC), as the EGR fraction continues to increase, even advancing spark may not be sufficient to prevent the reduction in combustion torque, and combustion stability may thus be degraded, at which point it may be desirable to conduct a controlled engine shutdown in order to avoid compromising the engine.

Accordingly, it may be desirable when operating in PttB mode under conditions of reduced air exchange, to measure or estimate unmetered EGR entering the intake manifold through the intake passage (e.g. 242) and intake air filter (e.g. 286), compensate for the increased EGR mass flow due to the unmetered EGR, and conduct a controlled engine shutdown in a case where continued engine operation is not desirable.

Thus, proceeding to 450, method 400 may include measuring or estimating the otherwise unmetered or unmeasured EGR. One or more methods may be used to do so. Accordingly, proceeding to FIG. 5, a first example method for measuring/estimating unmetered EGR is depicted. Method 500 may continue from FIG. 4, and may thus be carried out by a controller, such as controller 212 depicted at FIG. 2, and may be stored at the controller as executable instructions in non-transitory memory. Instructions for carrying out method 500 and the rest of the methods included herein may be executed by the controller based on instructions stored on a memory of the controller and in conjunction with signals received from sensors of the engine system, such as the sensors described above with reference to FIGS. 1-2. The controller may employ actuators as discussed above with regard to FIG. 4, to alter state of devices in the physical world.

At 505, method 500 may include, as the unmetered EGR fraction increases, calculating an increase in total air charge ($m_{tac}$) (refer to Eq. 3) as a function of a measured intake manifold air pressure and temperature.

Proceeding to 510, method 500 may include calculating the fresh air charge ($m_{fac}$) from injected fuel mass ($m_f$) and A/F ratio (refer to Eq. 2), where the exhaust gas sensor(s) (e.g. UEGO and/or HEGO) are being relied upon for maintaining desired A/F ratio.

Proceeding to 515, method 500 may include obtaining a measure of EGR mass flow ($m_{egr\_meas}$) from the EGR system. Such a measure may be obtained, for example, via at least one or more of a pressure sensor (e.g. 292) positioned in the EGR system, a duty cycle of the EGR valve (e.g. 253), etc.

Continuing to 520, method 500 may include calculating total EGR mass air flow entering engine cylinders ($m_{egr}$), as a function of a difference (refer to Eq. 4) between $m_{tac}$ (obtained at step 505) and $M_{fac}$ (obtained at step 510).

Proceeding to 525, method 500 may include calculating EGR mass flow entering the intake manifold from the throttle (e.g. 262), as a function of a difference (refer to Eq. 6) between $m_{egr}$ (obtained at step 520) and $m_{egr\_meas}$ (obtained at step 515).

Continuing to 530, method 500 may include calculating the EGR fraction ($m_{egr}/m_{tac}$) and/or percent EGR (100* (EGR fraction)).

Method 500 may then return to step 450 of method 400. However, it may be understood that method 500 may continually run in order to update the above described values, while method 400 is proceeding. Accordingly, dashed line 535 depicts the continual running or looping of method 500, where such looping continually updates the EGR fraction and communicates the results to method 400.

Figure 6:
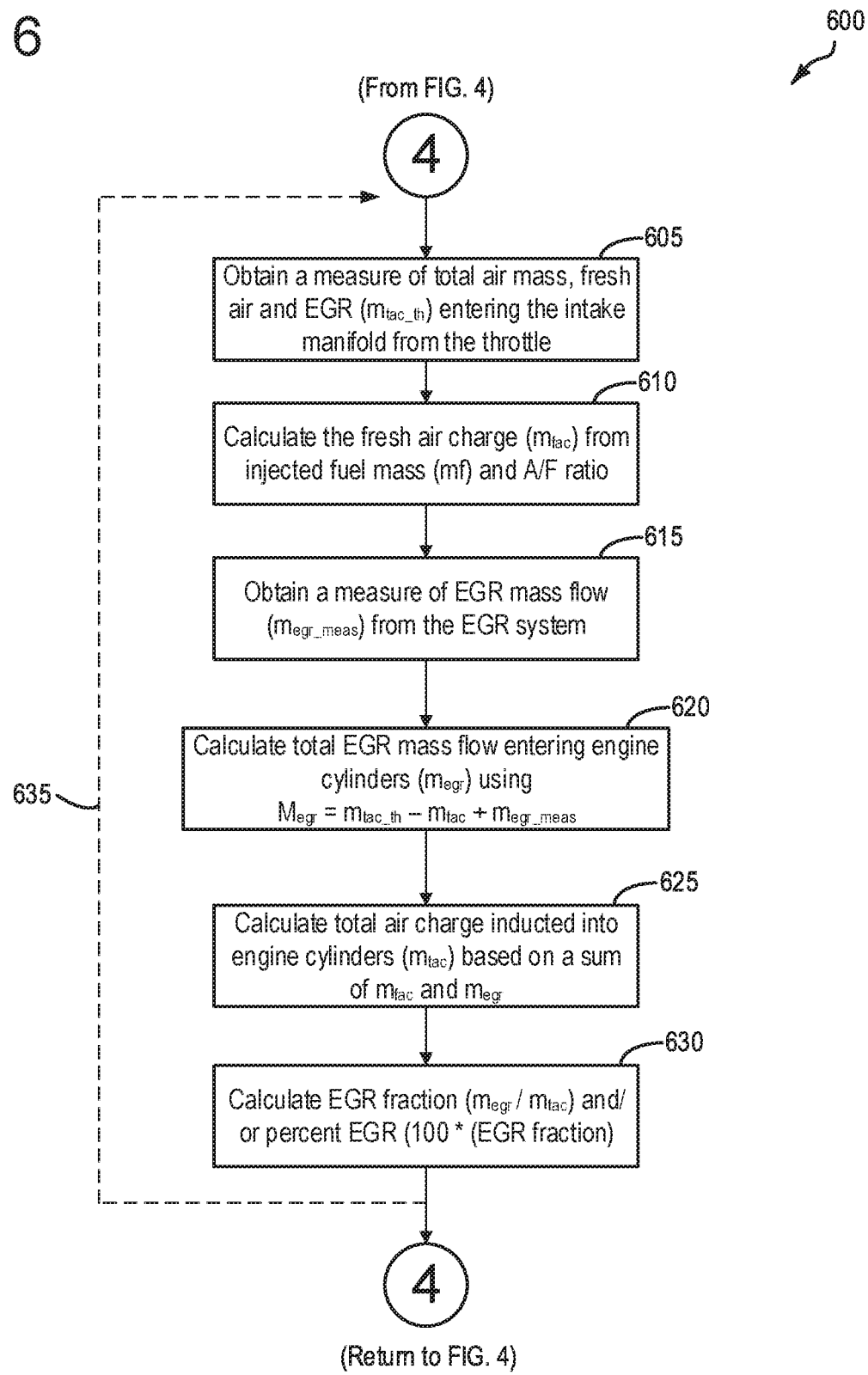
FIG. 6 depicts a high-level flowchart for a second example method for determining a level of unmetered EGR being inducted into an engine while a vehicle is being operated in PttB mode.

As mentioned above, method 500 depicts one example method for calculating EGR fraction. Turning now to FIG. 6, a second example method for measuring/estimating unmetered EGR is depicted. Method 600 may continue from step 450 of FIG. 4, and may thus be carried out by a controller, such as controller 212 depicted at FIG. 2, and may be stored at the controller as executable instructions in non-transitory memory. Instructions for carrying out method 600 and the rest of the methods included herein may be executed by the controller based on instructions stored on a memory of the controller and in conjunction with signals received from sensors of the engine system, such as the sensors described above with reference to FIGS. 1-2. The controller may employ actuators as discussed above with regard to FIG. 4, to alter state of devices in the physical world. In particular, method 600 may be utilized in situations where the engine is equipped with a MAF sensor (e.g. 238) to measure total air mass (fresh air and EGR) entering the intake manifold from the throttle (e.g. 262).

Method 600 begins at 605, and may include obtaining the measure of total air mass ($m_{tac\_th}$) entering the intake manifold from the throttle (refer to Eq. 5). Proceeding to 610, method 600 may include calculating the fresh air charge ($m_{fac}$) from injected fuel mass ($m_f$) and A/F ratio, as discussed above with regard to step 510 of method 500.

Continuing to 615, method 600 may include obtaining the measure of EGR mass flow ($m_{egr\_meas}$) from the EGR system, as discussed above with regard to step 515 of method 500. Proceeding to 620, method 600 may include calculating the total EGR mass flow entering engine cylinders ($m_{egr}$) as a function of $m_{tac\_th} - m_{fac} + m_{egr\_meas}$ (refer to Eq. 5 and Eq. 6), where $M_{tac\_th}$ is obtained at step 605, $m_{fac}$ is obtained at step 610, and $m_{egr\_meas}$ is obtained at step 615.

Proceeding to 625, method 600 may include calculating total air charge inducted into engine cylinders ($m_{tac}$) as a function of a sum (refer to Eq. 4) of $m_{fac}$ (obtained at step 610) and $m_{egr}$ (obtained at step 620). Then, continuing to 630, method 600 may include calculating the EGR fraction ($m_{egr}/m_{tac}$) and/or percent EGR (100*(EGR fraction)).

Method 600 may then return to step 450 of method 400. However, it may be understood that method 600 may continually run in order to update the above described values, while method 400 is proceeding. Accordingly, dashed line 635 depicts the continual running or looping of method 600, where such looping continually updates the EGR fraction and communicates the results to method 400.

Figure 7:
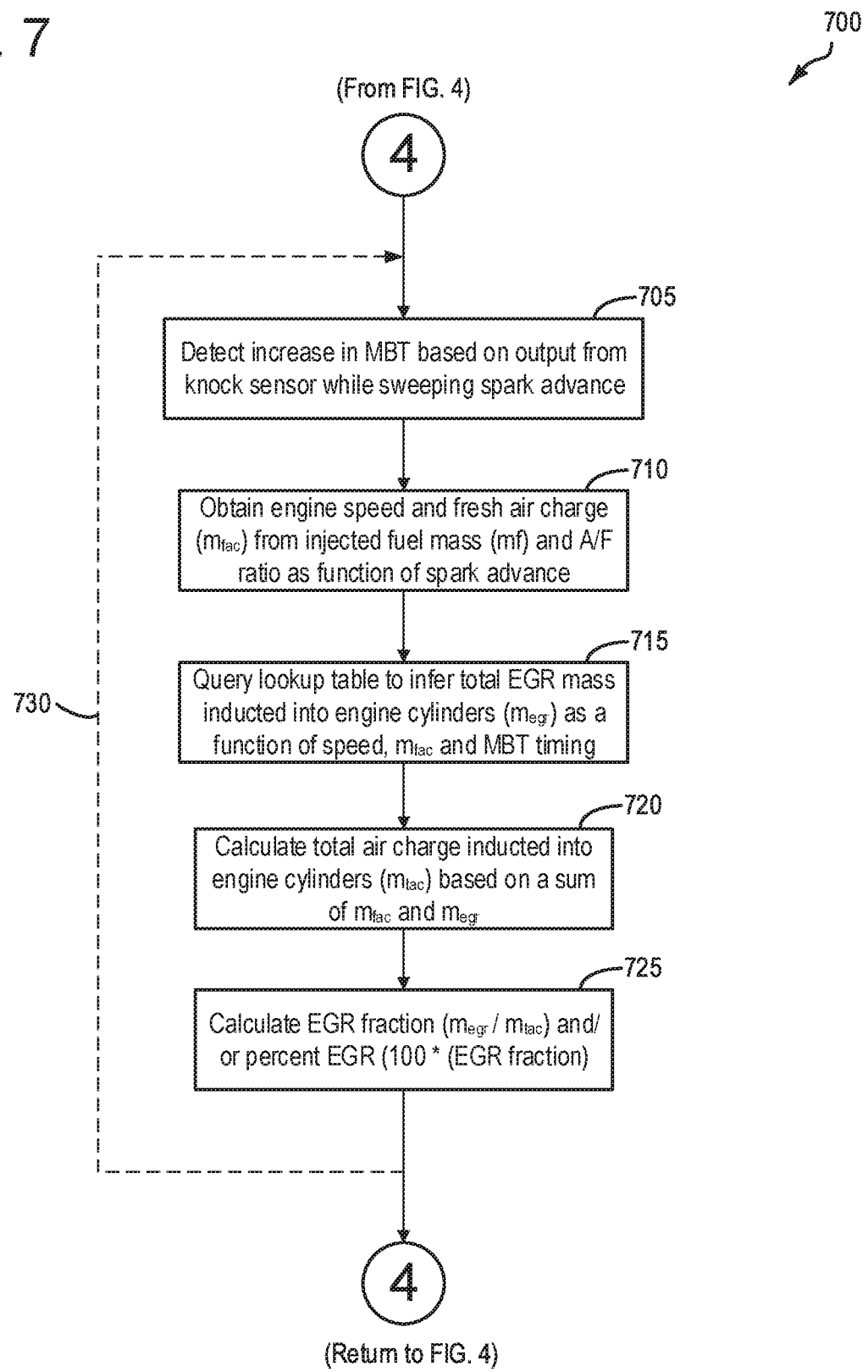
FIG. 7 depicts a high-level flowchart for a third example method for determining a level of unmetered EGR being inducted into an engine while a vehicle is being operated in PttB mode.
Figure 8:
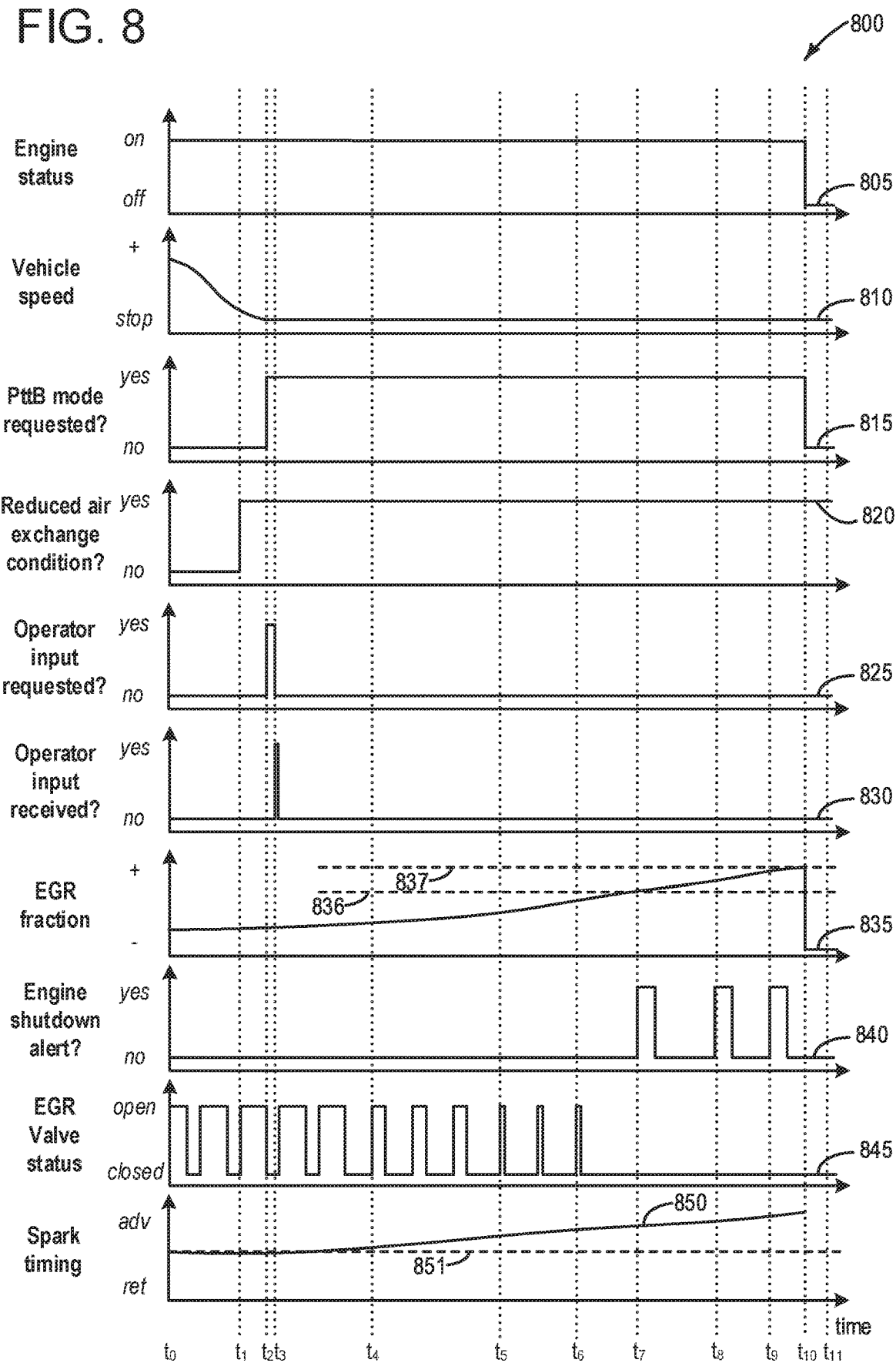
FIG. 8 depicts an example timeline for controlling engine operation in response to an indication that the vehicle is operating in the PttB mode where it is inferred that unmetered EGR is being inducted into the engine, according to the method of FIG. 4.

Turning now to FIG. 7, a third example method 700 for measuring/estimating unmetered EGR is depicted. Briefly, method 700 may include, sweeping (or in other words, changing) an amount by which spark provided to engine cylinders is advanced, to detect an increase in maximum brake torque (MBT) timing as the EGR fraction increases, where one or more knock sensor(s) (e.g. 296) are relied upon for detecting spark timing advance value(s) which are at or exceed MBT timing. Then, a table of MBT timing may be used, the table a function of engine speed and fresh air charge ($m_{fac}$), to enable the vehicle controller to infer the total EGR mass inducted into engine cylinders ($m_{egr}$), which may then be used to calculate EGR fraction and/or percent EGR.

Method 700 may continue from step 450 of FIG. 4, and may thus be carried out by a controller, such as controller 212 depicted at FIG. 2, and may be stored at the controller as executable instructions in non-transitory memory. Instructions for carrying out method 700 and the rest of the methods included herein may be executed by the controller based on instructions stored on a memory of the controller and in conjunction with signals received from sensors of the engine system, such as the sensors described above with reference to FIGS. 1-2. The controller may employ actuators as discussed above with regard to FIG. 4, to alter state of devices in the physical world.

Accordingly, method 700 begins at 705 and may include sweeping spark advance and obtaining output from the knock sensor (e.g. 296) in order to detect spark timing advance value(s) that meet or exceed MBT timing. Results may be stored at the controller, for example. Proceeding to 710, method 700 may include obtaining engine speed (e.g. in revolutions per minute, or RPM) and fresh air charge ($m_{fac}$), for the spark advance timing value(s) recorded at 705, where the fresh air charge ($m_{fac}$) is calculated from injected fuel mass ($m_f$) and A/F ratio (refer to Eq. 2), similar to that discussed above at step 510 of FIG. 5, and step 610 of method 600.

Proceeding to 715, method 700 may include querying a lookup table stored at the controller to infer total EGR mass inducted into engine cylinders ($m_{egr}$). It may be understood that such a lookup table may be generated during dynamometer testing as part of an engine calibration process.

With $m_{egr}$ obtained at 715, method 700 may proceed to 720. At 720, method 700 may include calculating total air charge inducted into engine cylinders ($m_{tac}$), based on a sum (refer to Eq. 4) of $m_{fac}$ (obtained at step 710) and $m_{egr}$ (obtained at step 715). Then, continuing to 725, method 700 may include calculating EGR fraction ($m_{egr}/m_{tac}$) and/or percent EGR (100*(EGR fraction)), similar to that discussed above with regard to FIGS. 5-6.

Method 700 may then return to step 450 of method 400. However, it may be understood that method 700 may continually run in order to update the above described values, while method 400 is proceeding. Accordingly, dashed line 730 depicts the continual running or looping of method 700, where such looping continually updates the EGR fraction and communicates the results to method 400.

Returning to step 450 of method 400, with the EGR fraction determined by one of method 500, 600, or 700, method 400 may proceed to 455. At 455, method 400 may include compensating for the unmetered EGR flow, or in other words, compensating for the uncontrolled increased EGR being inducted into the engine. Compensating the increased EGR flow may include one or more of adjusting a duty cycle of the EGR valve (e.g. 253) to reduce EGR mass flow from the EGR system (e.g. 249) and/or advancing spark timing to compensate for the uncontrolled increased EGR being inducted into the engine. In this way, desired engine torque may be maintained as the amount of EGR being inducted into the engine increases as a result of operating in PttB mode under conditions of reduced air exchange.

Proceeding to 460, method 400 may include indicating whether the EGR fraction (calculated above with regard to step 450) exceeds a first threshold EGR fraction. The first threshold EGR fraction may comprise a non-zero EGR fraction which is near (within a predetermined amount) an EGR fraction for which compensatory methodology for maintaining desired engine torque will be ineffective (e.g. greater than 0.2, greater than 0.3, greater than 0.4). If, at 460, the first threshold EGR fraction has not been indicated to have been reached, then method 400 may return to 450, where the EGR fraction may continue to be determined and compensated for (step 455). Alternatively, in response to the EGR fraction being indicated to have reached the first threshold EGR fraction, method 400 may proceed to 465. At 465, method 400 may include alerting the vehicle operator of an impending controlled engine shutdown event, in the absence of mitigating action.

Such an alert may be similar in nature to the alerts discussed above with regard to step 420, but may be in some examples slightly different in order to convey the different information, specifically with regard to step 465 that the engine will be shut down because of potential engine instability which may further impact electrical loads being powered via the use of PttB mode. Thus, at 465, the alert may comprise a message communicated to the vehicle operator that engine stability has become an issue as a result of the condition of reduced air exchange. Such a message may include an indication that the engine will be shut down if mitigating action is not undertaken to reduce the EGR fraction being inducted to the engine. For example, the message may include instructions to increase air exchange in the vicinity of the vehicle. If such action is viable, this may result in a reduction in the EGR fraction being inducted to the engine, which may allow for the engine shut down to be avoided or at least postponed. As discussed above, such a message may be communicated to the vehicle operator via the vehicle instrument panel (e.g. 196) or a separate screen (e.g. Ford Sync screen) associated with the vehicle instrument panel in the form of a text-based message. In another example, such a message may comprise an audible message, communicated under the control of the controller and via one or more speaker(s) associated with the vehicle instrument panel. In such an example, the controller may string together a number of key words or phrases stored at the controller as a table, to generate the audible message. Such an audible message may be provided in addition to or alternative to the text-based message via the instrument panel. In another example, such a message may additionally or alternatively comprise a text message sent to a software application used by the vehicle operator (e.g. smart phone application, tablet application, etc.), and/or a text message sent to the vehicle operator's phone (e.g. smart phone). In still other examples, such a message may additionally or alternatively include the controller of the vehicle commanding a particular sequence of horn honking (e.g. five honks in rapid succession, etc.) and/or particular sequence of exterior and/or interior light flashing.

While not explicitly illustrated, in some examples when the EGR fraction is determined to be above the first threshold EGR fraction, the controller may command a shutdown of the second priority outlets mentioned above, while maintaining power to the first priority outlets. In such an example, the alert at 465 may be referred to as a first EGR fraction alert and may include information pertaining to the fact that the second priority outlets are being shut down. In some examples the alert may include a time frame (e.g. 1 minute or less, 30 seconds or less, 15 seconds or less, etc.) in which the second priority outlets will be shut down in response to the EGR fraction being above the first threshold EGR fraction, such that the vehicle operator has a predetermined amount of time t0 disconnect components from the second priority outlets before they are shut down via the controller.

Upon communicating the message to the vehicle operator at 465, method 400 may proceed to 470. At 470, method 400 may include continuing to monitor and compensate the EGR fraction being inducted to the engine, as discussed above with regard to steps 450 and 455 of method 400. Continuing to 475, method 400 may include indicating whether the EGR fraction has reached a second threshold EGR fraction. It may be understood that the second threshold EGR fraction may comprise an EGR fraction the predetermined amount (see above description with regard to step 460) above the first threshold EGR fraction. In other words, it may be understood that the second threshold EGR fraction may comprise a level of EGR being inducted to the engine for which compensatory mechanisms such as advancing spark and/or reducing EGR flow (e.g. to no flow) are no longer expected to be sufficient for maintaining desired engine torque.

If, at 475, it is indicated that the second threshold EGR fraction has not been reached, method 400 may return to 460, where it may be again assessed as to whether the EGR fraction is still above the first threshold EGR fraction. In other words, in a case where mitigating action has been taken to increase air exchange in the vicinity of the vehicle, then the EGR fraction being inducted to the engine may be reduced to below the first threshold EGR fraction. Alternatively, if the EGR fraction continues to be above the first threshold EGR fraction, then EGR fraction may continue to be monitored and compensated for until it is indicated that the EGR fraction has reached the second threshold EGR fraction. In some examples, more than one alert may be provided in a sequential fashion as the EGR fraction approaches the second threshold EGR fraction. For example, a first alert may be communicated to the vehicle operator when the EGR fraction is indicated to have exceeded the first threshold EGR fraction, then a second alert may be communicated at a predetermined time after the first alert (or when the EGR fraction increases a predetermined amount past the first threshold EGR fraction), then a third alert may be communicated at another predetermined time after the second alert (or when the EGR fraction increases another predetermined amount past the first threshold EGR fraction), and so on.

In response to the EGR fraction reaching or exceeding the second threshold EGR fraction, method 400 may proceed to 480. At 480, method 400 may include shutting down the engine. Specifically, fuel injection to engine cylinders may be deactivated under control of the vehicle controller, and spark provided to engine cylinders may be discontinued under control of the vehicle controller. Method 400 may then end.

While not explicitly illustrated, in some examples when the EGR fraction is determined to be above the second threshold EGR fraction, the controller may command a shutdown of the first priority outlets mentioned above prior to shutting down the engine. In such an example, an alert similar in nature as that at 465, but referred to herein as a second EGR fraction alert, may include information pertaining to the fact that the first priority outlets are being shut down. In some examples the alert may include a time frame or predetermined duration (e.g. 1 minute or less, 30 seconds or less, 15 seconds or less, etc.) in which the first priority outlets will be shut down in response to the EGR fraction being above the second threshold EGR fraction, such that the vehicle operator may have a predetermined amount of time t0 disconnect components from the first priority outlets before the engine is shut down.

Turning now to FIG. 8, an example timeline 800 is depicted, illustrating engine control methodology under situations where PttB mode is requested, according to the methods of FIGS. 4-7. Timeline 800 includes plot 805, indicating engine status (on or off) over time. It may be understood that when the engine is on, in this example timeline, the engine is combusting air and fuel. Timeline 800 further includes plot 810, indicating vehicle speed (e.g. miles per hour, or mph), over time. The vehicle may either be stopped (e.g. 0 mph), or may be at a speed greater than (+) stopped. Timeline 800 further includes plot 815, indicating whether PttB mode has been requested by the vehicle operator (yes or no), over time. Timeline 800 further includes plot 820, indicating whether the vehicle is indicated to be in a reduced air exchange condition (yes or no), over time. Timeline 800 further includes plot 825, indicating whether vehicle operator input is requested by the controller of the vehicle (yes or no), over time. Timeline 800 further includes plot 830, indicating whether vehicle operator input has been received at the controller (yes or no), in response to the operator input being requested, over time. Timeline 800 further includes plot 835, indicating an EGR fraction being inducted to the engine, over time. Line 836 represents a first threshold EGR fraction which, if reached, one or more alerts may be communicated to the vehicle operator of an impending engine shutdown unless mitigating action is taken. Line 837 represents a second threshold EGR fraction which, if reached, may result in a controlled engine shutdown event. It may be understood that the first threshold EGR fraction and the second threshold EGR fraction may be pre-calibrated as a function of engine speed and load for differing amounts of EGR and spark timing, with regard to combustion stability. Combustion stability may be a function of misfire, engine hesitation, stall events, etc. Accordingly, timeline 800 further includes plot 840, indicating whether such an engine shutdown alert has been provided to the vehicle operator (yes or no), over time. Timeline 800 further includes plot 845, indicating EGR valve status (fully open or fully closed), over time. Timeline 800 further includes plot 850, indicating spark timing provided to the engine cylinders, over time. Spark timing may be advanced or retarded, as compared to being neither advanced nor retarded, as represented by dashed line 851.

At time t0, the engine is on, combusting air and fuel (plot 805). The vehicle is being propelled by the engine, as the vehicle speed is at a positive, non-zero speed (plot 810). PttB mode is not requested (plot 815), and as of time t0, the vehicle is not operating under a condition of reduced air exchange (plot 820). In other words, it may be understood that at time t0, the vehicle is travelling along a road with adequate air exchange such that exhaust from the engine to atmosphere is not being substantially re-inducted to the engine via the intake passage (e.g. 242). As PttB mode has not been requested and the vehicle is not being operated under conditions of reduced air exchange, vehicle operator input is not requested (plot 825), and accordingly, operator input has not been received (plot 830). There is some level of EGR being routed to the intake manifold (plot 835), however it may be understood that at time t0, the EGR being routed to the intake manifold comprises EGR being actively directed to the intake manifold under control of the vehicle controller, through the EGR system (e.g. 249), specifically via controlling a duty cycle of the EGR valve (plot 845). There is no engine shutdown alert being provided at time t0 (plot 840), and spark timing is neither substantially advanced nor retarded (plot 850).

Between time t0 and t1, the vehicle slows down, and at time t1 a reduced air exchange condition is indicated. As discussed above, such a condition may be indicated based on a loss of GPS satellite signals as monitored via the onboard navigation system. As one example, in a case where the onboard navigation system is in communication with twelve GPS satellites, and the number drops by 3, 4, 5, 6, 7, etc., it may be inferred that the vehicle has entered into a reduced air exchange environment. In some examples, such a condition may additionally or alternatively be indicated via one or more onboard cameras (e.g. 195), configured to monitor a space surrounding the vehicle and to communicate to the vehicle controller when a condition of reduced air exchange is apparent from images and/or video recorded via the onboard cameras. In some examples where the vehicle includes one or more of lasers, radar, sonar, and/or acoustic sensors (e.g. 133), such a condition of reduced air exchange may additionally or alternatively be indicated based on output from one or more of such sensor(s). In still other examples, such an indication of a reduced air exchange condition may be indicated based on learned information stored at the controller, as discussed in detail above with regard to FIG. 3. Specifically, there may be circumstances where a vehicle is commonly driven to a location of reduced air exchange (e.g. parking garage, construction site, etc.), and such information may be learned over time by the controller such that when the vehicle is at such a location, a condition of reduced air exchange may be indicated.

At time t2, the vehicle comes to a stop (plot 810), and the vehicle operator requests PttB mode for powering one or more electrical loads external to the vehicle. Thus, in this example timeline it may be understood that the condition of reduced air exchange comprises a construction site where the vehicle has been driven into a portion of the site with reduced air exchange between exhaust and atmosphere, such that exhaust gas emitted to atmosphere may be re-inducted to the engine via the intake passage over time. The engine is maintained on (plot 805), as the PttB mode is requested.

With the engine in operation and further in response to PttB mode having been requested and still further in response to an indication that the vehicle is in an environment of reduce air exchange, the vehicle controller initiates an alert requesting operator input in order to proceed with PttB mode under control of the engine. In this example timeline, while not explicitly illustrated, it may be understood that the alert comprises an audible alert requesting vehicle operator input, and additionally includes a text-based alert displayed on a screen associated with the vehicle instrument panel.

In response to the request for operator input at time t2, at time t3 the operator input is received by the controller. Specifically, in this example timeline, it may be understood that the vehicle operator has input into the screen on the instrument panel, a desire to maintain the engine in operation for powering external electrical loads, even though it has been made apparent via the alert provided to the vehicle operator that the vehicle is in a reduced air exchange environment.

Figure 5:
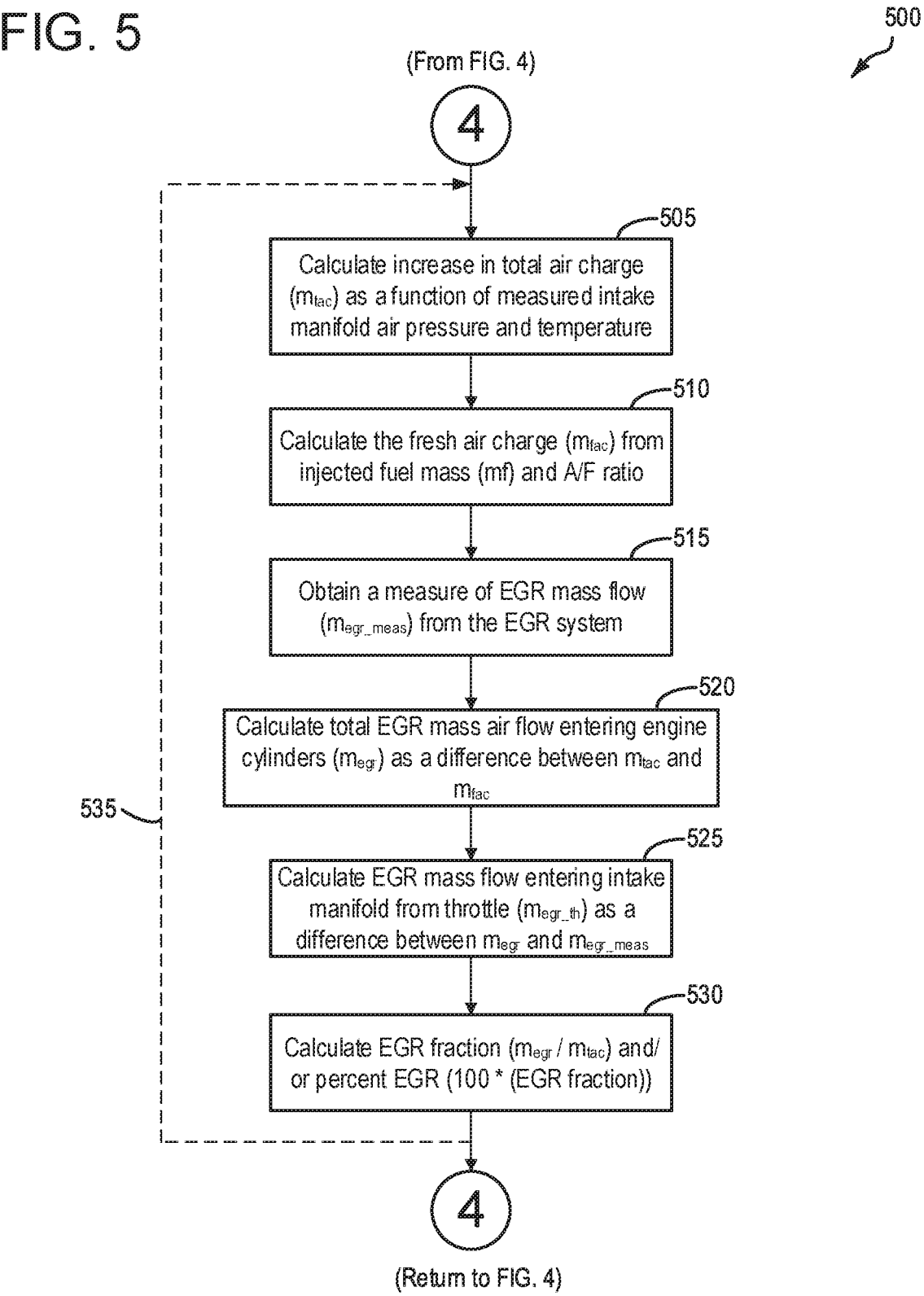
FIG. 5 depicts a high-level flowchart for a first example method for determining a level of unmetered EGR being inducted into an engine while a vehicle is being operated in PttB mode.

Accordingly, between time t3 and t4, engine operation continues for powering the desired external electrical loads. Furthermore, while not explicitly illustrated at timeline 800, it may be understood that any one of the methods of FIGS. 5-7 are utilized in order to monitor the EGR fraction being inducted to engine cylinders. However, between time t3 and t4, the EGR fraction does not substantially change, as the engine has only been running in the reduce air exchange environment for a short time. Accordingly, the duty cycle of the EGR valve remains unchanged between time t3 and t4, and spark is slightly advanced to compensate for a small amount of increased EGR fraction being inducted to engine cylinders.

Between time t4 and t5, the EGR fraction is indicated to rise substantially, as monitored via one or more of the methods of FIGS. 5-7. To compensate for such a rise, engine control strategy alters the duty cycle of the EGR valve, and advances spark timing, in order to maintain desired engine torque for engine stability and for supplying the external electrical loads with uninterrupted power. Between time t5 and t6, a still further increase in EGR fraction is indicated, and further compensatory action is take, involving adjusting the EGR valve to be closed for a greater amount of time, and spark timing is further advanced. Similarly, between time t6 and t7 the EGR fraction continues to increase, and spark timing is further advanced and the EGR valve is commanded closed to choke off any exhaust being routed to the intake manifold via the EGR system.

At time t7, the first threshold EGR fraction is reached. Accordingly, an alert is provided to the vehicle operator, indicative of an imminent engine shutdown if mitigating action is not undertaken. In this example timeline, it may be understood that the alert comprises an audible message in the form of a particular sequence of horn honks, which may be readily heard over any equipment that the vehicle is powering external to the vehicle. Additionally, the alert comprises a text message sent to the vehicle operator's phone, and still further includes a text-based message displayed on the vehicle instrument panel.

However, between time t7 and t8, the EGR fraction is continued to be monitored, and is indicated to continue increasing. At time t8, a second alert is issued, the second alert comprising the same alert as the first alert issued at time t7, indicating an imminent engine shutdown if mitigating action is not taken. Between time t8 and t9, the EGR fraction continues to rise, and at time t9, A third alert is issued indicating the imminent engine shutdown. At time t10, the second threshold EGR fraction is indicated to be reached, and thus, the engine is controlled to be shut down (plot 805). It may be understood that engine shutdown includes the vehicle controller commanding fuel injection to engine cylinders be stopped, and further includes commanding spark plugs coupled to engine cylinders to stop providing spark. With the engine shut down at time t10, the EGR fraction being inducted to engine cylinders rapidly drops. Furthermore, PttB mode is no longer requested, as conditions have become such that PttB mode is no longer an option for the vehicle in the particular location. In other words, even if the vehicle operator attempts to reinitate PttB mode, PttB mode may be prevented from being initiated via the vehicle controller. Between time t10 and t11, the engine is maintained off.

Thus, discussed herein, a method may comprise via a controller, detecting that a vehicle is in a condition of reduced air exchange, and responsive to a request to operate an engine of the vehicle to power one or more loads external to the vehicle while the vehicle is stationary, generating an alert of the reduced air exchange and discontinuing engine operation if a response to the alert is not received from a vehicle operator within a threshold duration.

For such a method, detecting that the vehicle is in the condition of reduced air exchange may include an indication of a loss of communication with a threshold number of global positioning system satellites.

For such a method, detecting that the vehicle is in the condition of reduced air exchange may be based on a driving route that is learned over time and stored at the controller.

For such a method, the method may further comprise discontinuing engine operation in response to an indication that the one or more loads external to the vehicle have been disconnected from a power box that receives power from operation of the engine prior to the response to the alert being received.

For such a method, the condition of reduced air exchange may include the vehicle being in a location in which operation of the engine leads to an increase in a concentration of exhaust gas in air surrounding the vehicle over time.

For such a method, the method may further comprise operating the engine to power the one or more loads external to the vehicle when the response to the alert is received from the vehicle operator within the threshold duration, and monitoring an increase in exhaust gas being inducted into the engine by way of an air intake passage to the engine while the engine is in operation. In such an example, the method may further comprise reducing a rate at which an exhaust gas recirculation valve positioned in an exhaust gas recirculation system is duty cycled to compensate for the increase in exhaust gas being inducted into the engine by way of the air intake passage to the engine. As another example, such a method may further comprise advancing a timing of spark provided to one or more cylinders of the engine to compensate for the increase in exhaust gas being inducted into the engine by way of the air intake passage to the engine. As another example, such a method may further comprise in response to the increase in exhaust gas being inducted into the engine reaching a first threshold, notifying the vehicle operator that operation of the engine will be discontinued if action is not taken to mitigate the condition of reduced air exchange. In response to the increase in exhaust gas being inducted into the engine reaching a second threshold that is greater than the first threshold, discontinuing operation of the engine.

For such a method, the method may further comprise monitoring a temperature of the engine while the engine is operating to power the one or more loads external to the vehicle, and in response to the temperature of the engine reaching a first engine temperature threshold, alerting the vehicle operator of a request to open a hood of the vehicle to reduce the temperature of the engine. In such an example, in response to the temperature of the engine reaching a second engine temperature threshold that is greater than the first engine temperature threshold, engine operation may be discontinued.

Another example of a method may comprise operating an engine of a vehicle to power an external load where the engine is stationary and is operating under a condition of reduced air exchange, monitoring an increase in exhaust gas being inducted to the engine via an air intake passage to the engine, communicating to a vehicle operator the increase with respect to a first threshold increase and a second threshold increase, and shutting down the engine responsive to the second threshold increase being reached.

In such an example, communicating to the vehicle operator the increase may involve notifying the vehicle operator that the increase in exhaust gas being inducted to the engine has reached the first threshold increase and of an impending engine shutdown if mitigating action is not taken to increase air circulation in a vicinity of the vehicle.

As an example, the first threshold increase may be lower than the second threshold increase.

As another example, communicating to the vehicle operator the increase may be via one or more of an audible message, a visual message via a vehicle instrument panel, and a text-based message sent to a computing device used via the vehicle operator.

As another example, communicating to the vehicle operator the increase may be via a real-time display on a screen located in the vehicle, where the real-time display depicts the increase in exhaust gas being inducted to the engine by way of the air intake passage as a function of time.

As another example, operating the engine to power the external load under the condition of reduced air exchange may further comprise issuing an alert to the vehicle operator of the condition of reduced air exchange, where the alert includes a request for input in order to proceed with operating the engine to power the external load under the condition of reduced air exchange. In such an example, the method may include shutting down the engine if the request for input is not received within a predetermined duration of issuing of the alert.

While the above description relates to control of engine operation under conditions of reduced air exchange, other factors may additionally or alternatively contribute to providing consistent and/or maximal electrical power to external loads. One such example comprises engine temperature. Specifically, as engine temperature rises while powering external loads, heat transfer from the engine to the generator (e.g. generator 160 or motor/generator 293) may reduce generator output capability, thus reducing a maximal electrical power for supplying external loads. While a cooling fan (e.g. 295) may be utilized to provide engine cooling while the engine is operating in PttB mode, operating the engine cooling fan may consume a significant amount of power which could otherwise be utilized to power the external loads. Furthermore, operating the cooling fan may reduce fuel economy as the engine is utilized to power the cooling fan in addition to the external loads. Thus, it may be desirable to avoid use of the cooling fan when possible, and/or to use less power for the cooling fan when possible.

Accordingly, turning now to FIG. 9, an example method 900 for reducing engine temperature while operating in PttB mode, is depicted. Specifically, method 900 includes monitoring engine temperature while the engine is being operated in PttB mode, and alerting a vehicle operator to take mitigating action in the form of opening a hood of the vehicle to reduce engine temperature when it is determined that engine temperatures have exceeded a first engine temperature threshold. In this way, use of the cooling fan while the engine is being used to power external loads may be reduced, which may improve fuel economy and increase a maximal power provided to external loads.

Method 900 will be described with reference to the systems described herein and shown in FIGS. 1-2, though it should be understood that similar methods may be applied to other systems without departing from the scope of this disclosure. Method 900 may be carried out by a controller, such as controller 212 in FIG. 2, and may be stored at the controller as executable instructions in non-transitory memory. Instructions for carrying out method 900 and the rest of the methods included herein may be executed by the controller based on instructions stored on a memory of the controller and in conjunction with signals received from sensors of the engine system, such as the sensors described above with reference to FIGS. 1-2. The controller may employ actuators such as spark plug(s) (e.g. 298), fuel injector(s) (e.g. 266), hood actuator (e.g. 185), etc., to alter states of devices in the physical world according to the methods depicted below.

Method 900 begins at 905 and may include estimating and/or measuring vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Proceeding to 910, method 900 includes indicating whether a vehicle operator has requested use of PttB mode. As discussed above, in some examples the vehicle operator may select PttB mode via the instrument panel (e.g. 196), and may further select an engine speed that the engine may run at for operating in PttB mode. If, at 910, PttB mode is not requested, then method 900 may proceed to 915. At 915, method 900 may include maintaining current vehicle operating parameters. For example, if the engine is operating to propel the vehicle without powering external loads, then such engine operation may be maintained. If the engine is not in operation, for example if electrical power is being used to propel the vehicle, then such vehicle operating parameters may be maintained. Other vehicle operating parameters that do not include powering external loads are within the scope of this disclosure. Method 900 may then end.

Returning to 910, method 900 may proceed to 920. At 920, method 900 may include controlling the engine is speed feedback mode where engine speed is held substantially constant and where load on the engine is determined from a total torque load on the engine from one or more sources including but not limited to external loads, as discussed in detail above with regard to step 445 of method 400.

With the engine being controlled in PttB mode, method 900 may proceed to 925. At 925, method 900 may include monitoring engine temperature. Engine temperature may be monitored via an engine coolant temperature sensor (e.g. 186), for example. Proceeding to 930, method 900 includes indicating whether engine temperature has exceeded a first engine temperature threshold. In one example, the first engine temperature threshold may comprise 50° F., although it may be understood that the first engine temperature threshold may comprise any temperature within a range of 40° F. to 60° F. without departing from the scope of this disclosure. If, at 930, it is indicated that engine temperature has not exceeded the first engine temperature threshold, method 900 may return to 925 where method 900 continues to monitor engine temperature while operating in the PttB mode.

Alternatively, in response to engine temperature being indicated to exceed the first engine temperature threshold at 930, method 900 may proceed to 935. At 935, method 900 may include issuing a first engine temperature alert to the vehicle operator, requesting the vehicle operator to take mitigating action to reduce engine temperature. Specifically, the first engine temperature alert may comprise a request to open a hood of the vehicle in order to cool the engine.

The first engine temperature alert may be communicated to the vehicle operator via the vehicle instrument panel (e.g. 196) or a separate screen (e.g. Ford Sync screen) associated with the vehicle instrument panel in the form of a text-based message. In another example, such an alert may comprise an audible message, communicated under the control of the controller and via one or more speaker(s) associated with the vehicle instrument panel. For example, the controller may string together a number of key words or phrases stored at the controller, to generate the audible message that requests the vehicle operator to open the hood of the vehicle. In some examples, the audible message may be provided in addition to or alternative to the text-based message via the instrument panel. Additionally or alternatively, the first engine temperature alert may be communicated to the vehicle operator wirelessly via, for example, a text message sent to a software application used by the vehicle operator (e.g. smart phone application, tablet application, etc.) and/or a text message sent to the vehicle operator's phone (e.g. smart phone). In still other examples, such a message may additionally or alternatively include the controller of the vehicle commanding a particular sequence of horn honking and/or a particular sequence of exterior and/or interior light flashing.

Continuing on, in response to the first engine temperature alert being sent to the vehicle operator, at 940 method 900 may include indicating whether the requested mitigating action has been taken by the vehicle operator. It may be understood that in some examples, if the mitigating action of opening the hood is not indicated to have been taken within a predetermined duration (e.g. 3 minutes or less, 2 minutes or less, 1 minute or less, etc.), then method 900 may indicate that mitigating action has not been taken, at which point method 900 may proceed to 960 as will be discussed in further detail below.

Alternatively, in response to an indication at the controller that the hood has been opened, method 900 may proceed to 945. It may be understood that in some examples the act of opening the hood may send a signal to the controller that the hood has been actuated open. Additionally or alternatively, in response to opening the hood, the vehicle operator may input into the vehicle instrument panel (e.g. via a touch screen such as the Ford Sync screen) or via the software application mentioned above, the fact that the hood has been opened, which may then be communicated to the controller. It may be understood that the opening of the hood may allow for increased air circulation in the vicinity of the engine compartment, which may thus serve to cool the engine, or at least to slow a rate at which engine temperature is rising. Cooling the engine and/or slowing the rate of engine temperature rise may allow for more efficient powering of the external loads.

At 945, with the hood open, method 900 may continue to monitor engine temperature. As discussed above, such monitoring may be via the engine coolant temperature sensor (e.g. 186). Furthermore, monitoring engine temperature may include monitoring temperature of engine cylinder temperatures via the one or more cylinder temperature sensor(s) (e.g. 257). Proceeding to 950, method 900 may include controlling the cooling fan (e.g. 295) as a function of the monitored engine temperature. As one example, with the hood open the cooling fan may be controlled to remain off, however as engine temperature continues to increase in a direction of a second engine temperature threshold (refer to step 955), then the cooling fan may be activated and controlled in a manner to maintain engine temperature below the second threshold where possible. In the interest of comparison, returning to 940, in response to the mitigating action of opening the hood not being taken, method 900 may proceed to 960 where the cooling fan is activated. Thus, it may be understood that when the mitigating action of opening the hood is taken as discussed above, it may be possible to avoid or at least postpone activation of the cooling fan, which may serve to improve fuel economy. However, under conditions where mitigating action is not taken, then the cooling fan may in turn be activated at 960. Proceeding to 965, method 900 may include monitoring engine temperature in similar fashion as that described at 945, and at 970 method 900 may include controlling the cooling fan as a function of monitored engine temperature, similar to that describe at 950. However, it may be understood that the difference between controlling the cooling fan at 950 where the hood is open, and controlling the cooling fan at 970 where the hood remains closed, is that an aggressiveness (e.g. fan speed) in which the fan is controlled may be reduced at step 950 as compared to step 970. In other words, when the hood remains closed, a rate at which engine temperature rises may be faster than when the hood is opened. As such fan speed may be increased at a faster rate at step 970 as compared to step 950. As such, lower energy usage may be achieved for cooling the engine at step 950 where the hood is open as compared to step 970 where the hood is closed.

Whether the hood is open or closed, method 900 may proceed to 955 where it may be assessed as to whether engine temperature has exceeded a second engine temperature threshold. It may be understood that the second engine temperature threshold may be greater than the first engine temperature threshold. It may be further understood that the second engine temperature threshold may comprise an engine temperature where, shutting off second priority outlets (e.g. compressor(s), saws, drills, etc.) may be desirable in order to maintain power to first priority outlets (e.g. computers and/or devices with sensitive electronics). As one example, second priority outlets may provide 240V power supply whereas first priority outlets may provide 120V power supply. However, such an example is illustrative and in other examples such a distinction may not be used to distinguish between first priority and second priority outlets, without departing from the scope of this disclosure.

As discussed above with regard to FIG. 2, cylinder temperature sensor(s) (e.g. 257) may be communicably coupled to breakers of outlets of the power box (e.g. 191), such that when it is determined via the cylinder temperature sensor(s) that engine temperature has exceeded the second engine temperature threshold, the second priority outlets may be automatically shut down. Accordingly, at 955, if the second engine temperature threshold is not indicated to have been reached, then method 900 may continue monitoring engine temperature and controlling the cooling fan in a manner dependent on whether the hood is open or not.

Alternatively, in response to engine temperature exceeding the second threshold, method 900 may proceed to 980, where a second engine temperature alert may be issued to the vehicle operator, notifying the vehicle operator that the second priority outlets are being shut down. The second engine temperature alert may be similar in nature to the first engine temperature alert discussed in detail above at 935, with the exception being that the second engine temperature alert may include information pertaining to the fact that the second priority outlets are being shut down.

While method 900 depicts the second engine temperature alert as being simultaneous with the shutting down of the second priority outlets, it may be understood that in other examples the second engine temperature alert may be issued in response to engine temperature as monitored via the cylinder temperature sensor(s) and/or engine coolant temperature sensor indicating that engine temperature is within a threshold number of degrees (e.g. within 5 degrees or less, within 3 degrees or less, etc.) of the second engine temperature threshold so that the vehicle operator may take mitigating action to disconnect externally powered components from the second priority outlets prior to the outlets being shut down. In some examples, such an alert may include information based on a rate at which temperature is increasing, so as to inform the vehicle operator of an estimated timeframe in which the second priority outlets may be shut down. For example, based on the rate at which the temperature is increasing, the controller may determine that the second priority outlets may be shut down in 5 minutes, 4 minutes, 3 minutes, etc. Such information may be communicated in the alert so that the vehicle operator understands the timeframe in which to shut down and/or prepare for the shutting down of the second priority outlets.

In response to the second priority outlets being shut down at 980, method 900 may proceed to 985. At 985, method 900 may include continuing to control the cooling fan as a function of monitored engine temperature. For example, similar to that discussed above, in a case where the hood was not opened via the vehicle operator, the speed at which the cooling fan is controlled may be greater than in a case where the hood was opened. In other words, after passing the second engine temperature threshold, the rate at which the engine temperature rises may be faster in a case where the hood remains closed as compared to a case where the hood is open. Accordingly, a more aggressive control (e.g. faster speed) of the cooling fan may be employed under circumstances where the hood is closed as compared to a case where the hood is open.

Proceeding to 990, method 900 may include indicating whether the engine temperature has exceeded a third engine temperature threshold. It may be understood that the third engine temperature threshold may comprise a temperature greater than the second engine temperature threshold, and may comprise a temperature where it may be desirable to shut down the engine to avoid undesirable issues related to powering the first priority outlets. Such undesirable issues may relate to engine hesitation, engine stall, engine degradation, etc. Such undesirable issues related to engine operation may in turn adversely impact external loads supplied by the first priority outlets, and accordingly, it may be desirable to shut down the power to the first priority outlets when engine temperature exceeds the third engine temperature threshold at 990. As discussed above, it may be understood that cylinder temperature sensor(s) (e.g. 257) may be communicably coupled to breakers of outlets of the power box (e.g. 191), such that when it is determined via the cylinder temperature sensor(s) that engine temperature has exceeded the third engine temperature threshold, the first priority outlets may be automatically shut down.

Accordingly, at 990, in response to an indication that the third engine temperature threshold has not been reached, method 900 may continue to control the cooling fan as a function of the monitored engine temperature. Alternatively, in response to engine temperature exceeding the third engine temperature threshold, method 900 may proceed to 995, where a third engine temperature alert may be issued to the vehicle operator, notifying the vehicle operator that the first priority outlets are being shut down. The third engine temperature alert may be similar in nature to the first engine temperature alert discussed in detail above at 935 (and the second engine temperature alert discussed in detail at 980), with the exception being that the third engine temperature alert may include information pertaining to the fact that the first priority outlets are being shut down.

While method 900 depicts the third engine temperature alert as being simultaneous with the shutting down of the first priority outlets, it may be understood that in other examples the third engine temperature alert may be issued in response to engine temperature as monitored via the cylinder temperature sensor(s) and/or engine coolant temperature sensor indicating that engine temperature is within a threshold number of degrees (e.g. within 5 degrees or less, within 3 degrees or less, etc.) of the third engine temperature threshold so that the vehicle operator may take mitigating action to disconnect externally powered components from the first priority outlets prior to the outlets being shut down. In some examples, such an alert may include information based on a rate at which temperature is increasing, so as to inform the vehicle operator of an estimated timeframe in which the first priority outlets may be shut down. For example, based on the rate at which the temperature is increasing, the controller may determine that the first priority outlets may be shut down in 5 minutes, 4 minutes, 3 minutes, etc. Such information may be communicated in the alert so that the vehicle operator understands the timeframe in which to shut down and/or prepare for the shutting down of the first priority outlets.

With the first priority outlets being shut down at 995, method 900 may proceed to 997. At 997, method 900 may include updating vehicle operating parameters. Specifically, updating vehicle operating parameters may include saving information at the controller pertaining to rates at which the first, second and third engine temperature thresholds were reached, whether or not the hood was opened in response to the first engine temperature threshold being reached, etc. Proceeding to 998, method 900 may include conducting an engine shut down by discontinuing the providing of fuel (and spark in cases where spark is provided) to the engine. Method 900 may then end.

Method 900 was discussed above in a manner that did not take into account a potential for unmetered EGR being inducted into the engine while the engine was being operated to supply power to one or more external loads via operation in the PttB mode. Method 900 was discussed as such because it is herein recognized that there may be situations where the vehicle is operating in conditions where air exchange is not reduced (e.g. open air operation), as compared to situations of reduced air exchange as discussed above. However, it is also herein recognized that there may be situations where PttB mode is requested in a condition of reduced air exchange and where it may also be desirable to issue alerts requesting mitigating action for decreasing engine temperature while the engine is being operated in PttB mode.

Accordingly, turning now to FIG. 10, a high level example method 1000 is depicted, illustrating example methodology for determining whether PttB mode is being requested under conditions of reduced air exchange or not, and if not, then PttB mode may be controlled as discussed above with regard to FIG. 9. Alternatively, in a case where PttB mode is being requested under conditions of reduced air exchange, then PttB mode may be controlled based on the methodologies of FIG. 4 and FIG. 9.

Method 1000 begins at 1005, and includes estimating and/or measuring vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Proceeding to 1010, method 1000 includes indicating whether PttB mode is requested. As discussed above, in some examples the vehicle operator may select PttB mode via the instrument panel (e.g. 196), and may further select an engine speed that the engine may run at for operating in PttB mode. If, at 1010, PttB mode is not requested, then method 1000 may proceed to 1015. At 1015, method 1000 may include maintaining current vehicle operating parameters. For example, if the engine is operating to propel the vehicle without powering external loads, then such engine operation may be maintained. If the engine is not in operation, for example if electrical power is being used to propel the vehicle, then such vehicle operating parameters may be maintained. Other vehicle operating parameters that do not include powering external loads are within the scope of this disclosure. Method 1000 may then end.

Returning to 1010, in response to the PttB mode request being received at the controller, method 1000 may proceed to 1020. At 1020, method 1000 may include indicating whether PttB mode is requested under conditions of reduced air exchange. Specifically, as discussed above, a condition of reduced air exchange may be indicated when the vehicle has driven to a location where there is an indicated decrease in GPS satellite signals either as the vehicle is coming to a stop or after the vehicle has stopped. For example, if 12 GPS satellite signals are indicated via the onboard navigation system and then the number is reduced by a threshold number as the vehicle is coming to a stop or after the vehicle has stopped, then a condition of reduced air exchange may be indicated. Additionally or alternatively, a condition of reduced air exchange may be indicated via the controller based on learned driving routines as discussed with regard to FIG. 3. For example, the controller may, in conjunction with the onboard navigation system in some examples, indicate that there is a high probability that the vehicle is in a condition of reduced air exchange based on prior information received at the controller pertaining to the location of the vehicle.

If, at 1020, a condition of reduced air exchange is not indicated, then method 1000 may proceed with controlling the PttB mode of engine operation as discussed above with regard to FIG. 9, and may not include taking steps to monitor unmetered EGR since it has been determined that the vehicle is not operating in a condition of reduced air exchange. Thus, at 1025, method 1000 may proceed to conducting method 900 as described at FIG. 9, and method 1000 may end.

Alternatively, in response to the controller determining that the vehicle operator has requested the PttB mode of engine operation and where it is further determined that the PttB mode has been requested under conditions of reduced air exchange, method 1000 may proceed to 1030. At 1030, method 1000 may include compensating unmetered EGR and taking mitigating action as discussed with regard to method 400 depicted at FIG. 4, and may further include monitoring engine temperature and taking mitigating action as discussed with regard to method 900 depicted at FIG. 9. In other words, the two methods of FIG. 4 and FIG. 9 may run at the same time, and the two methods may communicate with one another.

Specifically, examples of how the methods of FIG. 4 and FIG. 9 may be used in a situation where PttB mode is requested and a condition of reduced air exchange is indicated, will now be discussed. In one example, in response to PttB mode being requested under conditions of reduced air exchange, engine temperature may be monitored via the methodology of FIG. 9 and unmetered EGR may be monitored as per the methodology of FIG. 4. In a case where engine temperature reaches the first engine temperature threshold (refer to step 930 of method 900) before unmetered EGR reaches the first threshold EGR fraction (refer to step 460 of method 400), unmetered EGR may be monitored and compensated as discussed with regard to steps 450-455 of method 400. In response to the engine temperature reaching the first engine temperature threshold, the first engine temperature alert may be issued as discussed with regard to step 935 of method 900, and the engine cooling fan may be controlled as a function of whether the mitigating action of opening the hood was taken or not. Then, assuming that the unmetered EGR reaches the first threshold EGR fraction prior to engine temperature reaching the second engine temperature threshold (refer to step 955 of method 900), then an alert may be communicated to the vehicle operator notifying the operator of impending engine shutdown unless mitigating action is taken to increase air circulation (refer to step 465). In some examples, such an alert may include an indication that the second priority outlets are being shut down, or may include an indication that the second priority outlets will be shut down within a particular time frame (e.g. 1 minute or less, 30 seconds or less, 15 seconds or less, etc.). However, in other examples such an alert may be communicated without also including the shutting down of the second priority outlets or providing information that the second priority outlets will be shut down within the particular time frame.

In a case where the first threshold EGR fraction is reached and where the second priority outlets are shut down, then if subsequently the engine temperature reaches the second engine temperature threshold (refer to step 955 of method 900), then the second engine temperature alert may be issued to inform the vehicle operator of the second engine temperature threshold being reached, but because the second priority outlets are already shut down then the alert may not include information related to the shutting down of the second priority outlets. In other examples where when the first threshold EGR fraction is reached and the second priority outlets are not shut down but rather the alert related to the first threshold EGR fraction being reached includes just the information pertaining to the impending shut down if mitigating action is not taken, then when the second engine temperature alert is issued the second engine temperature alert may include the information pertaining to the fact that the second priority outlets are being shut down or will be shut down, due to the second engine temperature threshold being reached.

Next, if the EGR fraction exceeds the second threshold EGR fraction prior to the engine temperature exceeding the third engine temperature threshold, then the fact that the second threshold EGR fraction has been reached may result in the engine being shut down, which may additionally include an alert indicating that the first priority outlets will be shut down within a predetermined amount of time. In other words, although the engine temperature has remained below the third engine temperature threshold, because unmetered EGR has been determined to exceed the second threshold EGR fraction, action may be taken to shut down the first priority outlets and conduct engine shutdown. Alternatively, if the third engine temperature threshold is reached prior to the unmetered EGR being determined to exceed the second threshold EGR fraction, then the third alert related to engine temperature reaching the third engine temperature threshold may be issued (refer to step 995 of method 900) which may include shutting down of first priority outlets or providing information pertaining to when the first priority outlets will be shut down, and then the engine may be shut down.

The example above is meant to comprise an illustrative example of how the methods of FIG. 4 and FIG. 9 may be used in conjunction with one another under circumstances where PttB mode is requested under conditions of reduced air exchange. Such an example is not meant to be limiting. For example, in other situations engine temperature may reach the second engine temperature threshold before the first threshold EGR fraction is exceeded. In such an example, the second priority outlets may be shut down due to the second engine temperature threshold being reached. Then, if the first threshold EGR fraction is subsequently exceeded, then the alert (refer to step 465) may include information pertaining the impending engine shutdown but may not include information pertaining to the second priority outlets as they have already been shut down. Subsequently, if engine temperature exceeds the third engine temperature threshold before the second threshold EGR fraction is exceeded, then the first priority outlets may be shut down as discussed above based on the third engine temperature threshold being exceeded, and not because of unmetered EGR exceeding the second threshold EGR fraction. Other similar variations are within the scope of this disclosure.

Accordingly, as discussed with regard to FIG. 10, method 1000 allows for the monitoring of unmetered EGR and engine temperature under conditions where PttB mode is requested under conditions of reduced air exchange, and includes issuing of alerts to a vehicle operator specific to predetermined thresholds being reached or exceeded related to engine ingestion of unmetered EGR and engine temperature. In this way, reliable powering of external loads may be enabled and under situations where such reliable powering of external load may be compromised, mitigating action may be promptly taken.

Turning now to FIG. 11, depicted is an example timeline 1100 detailing an example of how the methods of FIG. 4 and FIG. 9 may be used in conjunction with one another under circumstances where PttB mode is requested under conditions of reduced air exchange. Timeline 1100 includes plot 1105, indicating a status (on or off) of the engine (e.g. 110). It may be understood that when the engine is "on" the engine is combusting air and fuel. Timeline 1100 further includes plot 1110, indicating a speed of the vehicle that includes the engine of plot 1105. The vehicle may be stopped or may be traveling at a speed greater than (+) stopped. Timeline 1100 further includes plot 1115, indicating whether PttB mode is requested by the vehicle operator (yes or no). Timeline 1100 further includes plot 1120, indicating whether a condition of reduced air exchange has been indicated (yes or no), over time. Timeline 1100 further includes plot 1125, indicating whether PttB mode input is requested (yes or no), and plot 1130, indicating whether PttB mode input has been received (yes or no), over time. Timeline 1100 further includes plot 1135, indicating an EGR fraction being inducted to the engine, over time. Line 1136 represents the first threshold EGR fraction (refer to step 460 of method 400), and line 1137 represents the second threshold EGR fraction (refer to step 475 of method 400). Timeline 1100 further includes plot 1140, indicating engine temperature, over time. Engine temperature may be determined via the engine coolant temperature sensor and/or cylinder temperature sensor(s) as discussed above with regard to FIGS. 1-2 respectively. Line 1141 represents the first engine temperature threshold (refer to step 930 of method 900), line 1142 represents the second engine temperature threshold (refer to step 955 of method 900), and line 1143 represents the third engine temperature threshold (refer to step 990 of method 900). Timeline 1100 further includes plot 1145, indicating whether an engine temperature alert has been communicated to the vehicle operator (yes or no), over time. Timeline 1100 further includes plot 1150, indicating a status of a hood of the vehicle (open or closed), over time. Timeline 1100 further includes plot 1155, indicating a status of the engine cooling fan (e.g. 295) (on or off), over time.

At time t0, the engine is in operation (plot 1105), and the vehicle is stopped (plot 1110). The hood is closed (plot 1150), and the engine cooling fan is off (plot 1155). A reduced air exchange condition has not yet been determined (plot 1120). PttB mode has not yet been requested (plot 1115) and accordingly, PttB mode input has not been requested (plot 1125) or received (plot 1130).

At time t1, a condition of reduced air exchange is determined (plot 1120). Thus, it may be understood that at time t0, the vehicle had just stopped, and by time t1 the controller has determined a decrease in GPS signals greater than the threshold number and/or relied upon learned driving routines stored at the controller to infer that the vehicle is in a condition of reduced air exchange.

At time t2, the PttB mode of engine operation is requested via the vehicle operator (plot 1115). In other words, at time t2 the vehicle operator has selected PttB mode via the vehicle instrument panel, and may further have selected an engine speed that the engine may run at for operating in the PttB mode of operation. Accordingly, at time t3, PttB mode input is requested (plot 815). Specifically, at time t3 the vehicle controller initiates an alert requesting operator input in order to proceed with PttB mode due to the indication of the vehicle being in a condition of reduced air exchange. In this example timeline, while not explicitly illustrated, it may be understood that the alert comprises an audible alert requesting vehicle operator input, and additionally includes a text-based alert displayed on a screen associated with the vehicle instrument panel.

In response to the request for operator input at time t3, at time t4 the operator input is received by the controller. Specifically, in this example timeline, it may be understood that the vehicle operator has input into the screen on the instrument panel, a desire to maintain the engine in operation for powering external electrical loads, even though it has been made apparent via the alert provided to the vehicle operator that the vehicle is in a reduced air exchange environment.

Between time t4 and t5, the engine is operated in PttB mode and one or more external loads are powered via such operation. While not explicitly illustrated, it may be understood that similar to that depicted at the timeline of FIG. 9, as the EGR fraction increases, duty cycle of the EGR valve (e.g. 253) may be reduced to compensate for unmetered EGR being ingested by the engine, and spark timing may be advanced as discussed above to similarly compensate for the increase in the EGR fraction. In this example timeline, it may be understood that taking such actions maintains the EGR fraction below the first threshold EGR fraction represented by line 1136 (see plot 1135), and thus no alerts pertaining to taking mitigating action to improve air exchange in the vicinity of the vehicle are issued in this example timeline.

However, between time t4 and t5 engine temperature increases, and at time t5 engine temperature (see plot 1140) is indicated to have reached the first engine temperature threshold represented by line 1141. Accordingly, the first engine temperature alert is issued at time t5 (refer to step 935 of method 900) to alert the vehicle operator of a request to take mitigating action in the form of opening the hood of the vehicle.

At time t6, the hood is opened. With the hood opened, engine temperature is maintained below the second engine temperature threshold between time t6 and t7, and as such, the cooling fan is maintained off (plot 1155). It may be understood that the action of opening the hood allows for improved air circulation between ambient air and the engine compartment, such that use of the cooling fan is avoided in this particular case. By avoiding use of the cooling fan, fuel economy may be improved.

At time t7, PttB mode is no longer requested (plot 1115). For example, in this example timeline the vehicle operator requests PttB mode be discontinued via a touchscreen associated with the vehicle instrument panel. Accordingly, with the vehicle stationary and PttB mode no longer requested, the engine is shut down via discontinuing the providing of fuel to the engine cylinders (plot 1105). Then, at time t8, the vehicle operator closes the hood (plot 1155).

Turning now to FIG. 12, depicted is an example real-time display 1200 illustrating real-time parameters of the present disclosure acquired via the controller and then sent to a software application that displays the real-time display on a screen associated with the vehicle instrument panel (e.g. Ford Sync screen). In some examples, the controller may additionally or alternatively send such real-time parameters to the software application operating on a computing device of the vehicle operator, including but not limited to a smart phone, laptop, tablet, etc. In this way, under circumstances where the vehicle operator is not in a cabin of the vehicle, such real-time parameters may still be available for viewing by the vehicle operator. Discussed herein, real-time refers to the controller processing data retrieved from one or more sensors as discussed above in a matter of milliseconds and sending the data to the software application for displaying the information via the real-time display so that the data is available for viewing by the vehicle operator essentially immediately.

As discussed above with regard to the methods of FIG. 4 and FIG. 9, alerts may be communicated to the vehicle operator visually or audibly. Accordingly, in one example visual alerts may be communicated to the vehicle operator via message center 1205. It may be understood that in some examples an audible message may additionally be communicated to the vehicle operator for issuing the particular alerts. In some examples, message center 1205 may comprise the same message center as message center 196 depicted above at FIG. 1, however in other examples, message center 1205 may be different than message center 196.

Depicted at message center 1205 is an example alert, alerting the vehicle operator that the first engine temperature threshold has been exceeded, and that the controller of the vehicle is requesting the vehicle operator to open the hood for engine cooling purposes. Such an alert may in some examples include the message center flashing (e.g. a series of several flashes from one color to another, or flashes of a same color but different intensity levels) to draw the vehicle operators attention to the alert. Additionally or alternatively, such an alert may include vehicle interior lights and/or external lights (e.g. headlights) flashing in a particular series which may be interpreted via the vehicle operator as an indication to check the message center. Additionally or alternatively, such an alert may include the horn of the vehicle honking in a particular pattern to draw the attention of the vehicle operator to the message center. Additionally or alternatively, where the alert is sent to the computing device of the vehicle operator, the computing device may issue a sound notifying the vehicle operator of the alert, or may vibrate, etc. to draw the attention of the vehicle operator to the message center.

In a situation where the alert includes a request for vehicle operator input, input may be communicated to the vehicle controller via a number of means. As one example, the vehicle operator may press one or more of the brake and/or accelerator pedal in a predetermined pattern to provide the input to the controller. Additionally or alternatively, the vehicle operator may provide the requested input via pressing a button or other actuator associated with an electric seat of the vehicle, a particular predetermined button or other actuator associated with a door of the vehicle, a particular predetermined button or other actuator associated with the steering wheel of the vehicle, etc. Additionally or alternatively, input may be communicated directly through the real-time display where the real-time display is displayed on a touch screen (e.g. Ford Sync screen). The real-time display 1200 may in some examples include an unmetered EGR fraction panel 1210. The unmetered EGR fraction panel 1210 may include an unmetered EGR plot 1212, which may display in real-time an amount of unmetered EGR ([EGR]) being ingested by the engine, in relation to the first threshold EGR fraction (refer to step 460 of method 400) and the second threshold EGR fraction (refer to step 475 of method 400), over time. Under circumstances where the first threshold EGR fraction is exceeded and the first EGR fraction alert is issued (refer to step 465 of method 400), the controller may send a signal to the software application to populate the query "1$^{st}$ alert issued?" at the "yes" designation. As discussed above with regard to FIG. 4, under circumstances where the first alert is issued, the alert may include information requesting feedback as to whether mitigating action has been taken to increase air flow in the vicinity of the vehicle. In response to mitigating action being taken (e.g. the vehicle operator opens a window, door, etc.), the vehicle operator may communicate the fact that mitigating action has been taken in any one of the manners described above for communicating actions to the controller. Then, the controller may send a signal to the software application to populate the query "mitigating action?" at the "yes" designation. As depicted for illustrative purposes, the unmetered EGR fraction displayed at the unmetered EGR plot 1212 remains below the first threshold EGR fraction and thus, neither the first nor the second alert is indicated to have been issued, and no mitigating action is indicated to have been taken to increase air flow in the vicinity of the vehicle. By providing a real-time monitor of the unmetered EGR fraction in relation to the first threshold EGR fraction and the second threshold EGR fraction, the vehicle operator may take mitigating action or prepare for taking mitigating action prior to the actual alerts being issued. Such display may improve vehicle operator satisfaction as opposed to situations where it is not known to the vehicle operator how close to the first threshold EGR fraction or the second threshold EGR fraction the unmetered EGR fraction actually is.

The real-time display 1200 may in some examples additionally or alternatively include an engine temperature panel 1215. Engine temperature panel 1215 may include engine temperature plot 1218 which may display in real-time a temperature of the engine in relation to the first engine temperature threshold (refer to step 930 of method 900), the second engine temperature threshold (refer to step 955 of method 900), and the third engine temperature threshold (refer to step 990 of method 900). In this example illustration, engine temperature is indicated to have exceeded the first engine temperature threshold, and thus it is indicated that the first alert is issued ("yes" is populated for the query "first alert issued?" However, because the second engine temperature threshold nor the third engine temperature threshold has been reached, it is indicated that alerts for such conditions have not been issued. Furthermore, at engine temperature panel 1215 include information pertaining to a status of the vehicle hood (open or closed). In this example illustration, in response to the first engine temperature threshold having been reached an alert is issued to the vehicle operator requesting mitigating action in the form of opening the hood, and in this example the hood has been opened and such information is displayed at the engine temperature panel. In some examples the designation pertaining to the hood status may be populated in response to input to the software application via the vehicle operator confirming the hood has been opened. In other examples, the controller may detect the fact that the hood has been opened, and may then send a signal to the software application to populate the "open" designation pertaining the query as to the status of the hood.

The real-time display may in some examples further include "time t0 empty" panel 1220. Time to empty panel 1220 may include a number of hours, minutes and seconds until the fuel tank runs out of fuel. The time t0 empty panel 1220 may take into account engine speed, engine load and fuel level and extrapolate the time t0 empty determination based on such parameters. As such parameters change, the time t0 empty determination may be adjusted accordingly. It may be understood that while depicted as a part of the real-time display 1200, in other examples the time-to-empty may additionally or alternatively be displayed where a "miles to empty" indication is provided to the vehicle operator, for example at a position on the vehicle dash. It may be understood that because the vehicle is stationary, "miles to empty" information may not apply and may not be relevant, and thus when operating in PttB mode the "miles to empty" display at the vehicle dash may be switched over to indicate "time t0 empty". By displaying an amount of time until the vehicle fuel tank is depleted of fuel, it may be easier for the vehicle operator to assess whether to continue operating in PttB mode or to discontinue PttB mode operation. While not explicitly illustrated, it may be understood that in some examples there may be a first time-to-empty threshold and a second time-to-empty threshold. As one example, the first time-to-empty threshold may comprise 20 minutes, and the second time-to-empty threshold may comprise 10 minutes. Such examples are meant to be illustrative. For example, if the time-to-empty calculation drops below the first time-to-empty threshold, then a first fuel level alert may be communicated to the vehicle operator in any one or more of the manners described above, alerting the vehicle operator of the amount of time remaining until the fuel in the fuel tank is depleted, so that the vehicle operator may take mitigating actions such as disconnecting the external loads from the power box, and/or shutting down PttB mode and discontinuing engine operation. If the first fuel level alert is issued and mitigating action is not taken, such that the time-to-empty calculation drops below the second time-to-empty threshold, then a second fuel level alert may be issued indicating the engine is being shut down in order to conserve enough fuel for propelling the vehicle to a refueling station.

In some examples, the first and the second time-to-empty thresholds may be adjustable. For example, the vehicle controller may retrieve information pertaining to a shortest distance from where the vehicle is parked to nearby refueling stations. Such information may be determined in conjunction with the onboard navigation system, via V2V and/or V2I communications, from information retrieved from learned driving routines, etc. As the shortest distance to the nearest refueling station increases, the first time-to-empty threshold and the second time-to-empty threshold may be adjusted upwards, and as the shortest distance to the nearest refueling station decreases, the first time-to-empty threshold and the second time-to-empty threshold may be adjusted downwards. Specifically, adjusting upwards in this example refers to the first time-to-empty threshold and the second time-to-empty threshold being set at greater times to empty, as compared to adjusting downwards which refers to the first time-to-empty threshold and the second time-to-empty threshold being set at lesser times to empty. As a concrete example, adjusting upwards may comprise adjusting the first time-to-empty threshold from 20 minutes to 30 minutes, whereas adjusting downwards may comprise adjusting the first time-to-empty threshold from 20 minutes to 15 minutes. In this way, alerts may be issued and engine shutdown may be controlled as a function of an estimated amount of fuel it may take to reach the nearest refueling station.

The real-time display may in some examples include an engine speed panel 1225. Engine speed panel 1225 may display current engine speed, and where the real-time display is displayed on a touch screen, may allow for touch-based modifications to the speed at which the engine is controlled. For example a drop-down panel (not specifically illustrated) stemming from the engine speed panel 1225 may be utilized to adjust engine speed for operating the engine in PttB mode. Inputting desired engine speed into the engine speed panel 1225 may be conducted in any manner known in the art for inputting desired values into the software application.

The real-time display may in some examples further include power generation level panel 1230. The power generation panel 1230 may provide real-time display of the level of power provided to the power box as a percentage of a maximum level. For example, as discussed above, unmetered EGR and/or engine temperature may contribute to less efficient power generation, and it may be desirable for a vehicle operator to readily appreciate the current level of power generation as a function of the maximum. In this way, the vehicle operator may in some examples selectively choose which external loads to keep powered, and which external loads to discontinue use.

In this way, engine operation may be controlled to supply power to a power box that in turn supplies power to one or more external loads under circumstances where the request for PttB mode occurs under conditions of reduced air exchange. By employing the use of thresholds and alerts related to one or more of unmetered EGR being inducted into the engine and/or engine temperature, consistent levels of power delivered to external loads may be realized. Specifically, mitigating action may be taken by vehicle operators in response to the alerts that are based on said thresholds to ensure consistent power levels, and where significant power degradation may occur due to engine stability issues pertaining to increased temperatures and/or induction of unmetered EGR, the engine may be automatically shut down to avoid engine degradation and/or undesired issues with external loads that are receiving degraded power supply.

The technical effect is to recognize that engine operation during conditions of reduced air exchange in order to power external loads may be desirable in some situations by vehicle operators, and that by use of a combination of thresholds and alerts, PttB mode may be reliably used under such circumstances. For example, a technical effect is to recognize that it may be desirable to, upon a request for PttB mode by a vehicle operator, indicate whether the vehicle is located in a condition of reduced air exchange and request input from the vehicle operator acknowledging such a condition and confirming the desire to proceed. Thus, a technical effect is to recognize that in a case where such a confirmation is not received, that the engine may be shut down to avoid issues related to power generation and engine stability which may occur when using PttB mode in a condition of reduced air exchange. A further technical effect is to recognize that there may be a number of ways to monitor unmetered EGR while a vehicle is stationary and is operating under conditions of reduced air exchange, as depicted above at FIGS. 4-7. A further technical effect is to recognize that in some examples, it may be desirable to selectively shut down second priority outlets (while maintaining first priority outlets active) for powering external loads when particular levels of unmetered EGR are detected and/or when particular engine temperatures are reached while the vehicle is operating in PttB mode. A further technical effect is to recognize that communicating by way of a real-time display, relevant parameters (e.g. levels of unmetered EGR, engine temperatures, time until fuel in the fuel tank is depleted, engine speed, current power output as a percent of a maximum power output, and messages) related to PttB mode operation a vehicle operator may be apprised in advance as to whether conditions are such that degraded power generation may occur, which may enable the vehicle operator to take mitigating action as they see fit.

Thus, the systems described herein and with regard to FIGS. 1-2, along with the methods described herein and with regard to FIGS. 3-7 and FIGS. 9-10, may enable one or more systems and one or more methods. In one example, a method comprises via a controller, detecting that a vehicle is in a condition of reduced air exchange; and responsive to a request to operate an engine of the vehicle to power one or more loads external to the vehicle while the vehicle is stationary, generating an alert of the reduced air exchange and discontinuing engine operation if a response to the alert is not received from a vehicle operator within a threshold duration. In a first example of the method, the method may further include detecting that the vehicle is in the condition of reduced air exchange includes an indication of a loss of communication with a threshold number of global positioning system satellites. A second example of the method optionally includes the first example, and further includes wherein detecting that the vehicle is in the condition of reduced air exchange is based on a driving route that is learned over time and stored at the controller. A third example of the method optionally includes any one or more or each of the first and second examples, and further comprises discontinuing engine operation in response to an indication that the one or more loads external to the vehicle have been disconnected from a power box that receives power from operation of the engine prior to the response to the alert being received. A fourth example of the method optionally includes any one or more or each of the first through third examples, and further includes wherein the condition of reduced air exchange includes the vehicle being in a location in which operation of the engine leads to an increase in a concentration of exhaust gas in air surrounding the vehicle over time. A fifth example of the method optionally includes any one or more or each of the first through fourth examples, and further comprises operating the engine to power the one or more loads external to the vehicle when the response to the alert is received from the vehicle operator within the threshold duration; and monitoring an increase in exhaust gas being inducted into the engine by way of an air intake passage to the engine while the engine is in operation. A sixth example of the method optionally includes any one or more or each of the first through fifth examples, and further comprises reducing a rate at which an exhaust gas recirculation valve positioned in an exhaust gas recirculation system is duty cycled to compensate for the increase in exhaust gas being inducted into the engine by way of the air intake passage to the engine. A seventh example of the method optionally includes any one or more or each of the first through sixth examples, and further comprises advancing a timing of spark provided to one or more cylinders of the engine to compensate for the increase in exhaust gas being inducted into the engine by way of the air intake passage to the engine. An eighth example of the method optionally includes any one or more or each of the first through seventh examples, and further comprises in response to the increase in exhaust gas being inducted into the engine reaching a first threshold, notifying the vehicle operator that operation of the engine will be discontinued if action is not taken to mitigate the condition of reduced air exchange. A ninth example of the method optionally includes any one or more or each of the first through eighth examples, and further comprises in response to the increase in exhaust gas being inducted into the engine reaching a second threshold that is greater than the first threshold, discontinuing operation of the engine. A tenth example of the method optionally includes any one or more or each of the first through ninth examples, and further comprises monitoring a temperature of the engine while the engine is operating to power the one or more loads external to the vehicle; and in response to the temperature of the engine reaching a first engine temperature threshold, alerting the vehicle operator of a request to open a hood of the vehicle to reduce the temperature of the engine, and in response to the temperature of the engine reaching a second engine temperature threshold that is greater than the first engine temperature threshold, discontinuing operation of the engine.

Another example of a method comprises operating an engine of a vehicle to power an external load where the engine is stationary and is operating under a condition of reduced air exchange; monitoring an increase in exhaust gas being inducted to the engine via an air intake passage to the engine; communicating to a vehicle operator the increase with respect to a first threshold increase and a second threshold increase; and shutting down the engine responsive to the second threshold increase being reached. In a first example of the method, the method further includes wherein communicating to the vehicle operator the increase involves notifying the vehicle operator that the increase in exhaust gas being inducted to the engine has reached the first threshold increase and of an impending engine shutdown if mitigating action is not taken to increase air circulation in a vicinity of the vehicle. A second example of the method optionally includes the first example, and further includes wherein the first threshold increase is lower than the second threshold increase. A third example of the method optionally includes any one or more or each of the first through second examples, and further includes wherein communicating to the vehicle operator the increase is via one or more of an audible message, a visual message via a vehicle instrument panel, and a text-based message sent to a computing device used via the vehicle operator. A fourth example of the method optionally includes any one or more or each of the first through third examples, and further includes wherein communicating to the vehicle operator the increase is via a real-time display on a screen located in the vehicle, where the real-time display depicts the increase in exhaust gas being inducted to the engine by way of the air intake passage as a function of time. A fifth example of the method optionally includes any one or more or each of the first through fourth examples, and further includes wherein operating the engine to power the external load under the condition of reduced air exchange further comprises: issuing an alert to the vehicle operator of the condition of reduced air exchange, where the alert includes a request for input in order to proceed with operating the engine to power the external load under the condition of reduced air exchange; and shutting down the engine if the request for input is not received within a predetermined duration of issuing of the alert.

An example of a system for a vehicle comprises an onboard navigation system; a power box for supplying power to one or more loads external to the vehicle, where the power box includes outlets of varying priority including at least first priority outlets and second priority outlets and where operation of an engine supplies power to the power box; and a controller with computer readable instructions stored on non-transitory memory that, when executed, cause the controller to: with the vehicle stationary, receive a request to operate the engine to supply power to the power box; via the onboard navigation system, determine whether the vehicle is in a condition of reduced air exchange and if so, issue an alert to an operator of the vehicle requesting input to the controller in order proceed with operation of the engine; responsive to the requested input being received, operate the engine to supply power to the power box and monitor for conditions of degraded power supply to the power box; and selectively discontinue supplying power to the first priority outlets and the second priority outlets based on the conditions of degraded power supply to the power box. In a first example of the system, the system further comprises one or more engine temperature sensor(s) for use in monitoring the conditions of degraded power supply to the power box as a function of engine temperature; and wherein the controller stores further instructions to discontinue supplying power to the second priority outlets but not the first priority outlets when an engine temperature threshold is reached, and discontinue supplying power to the first priority outlets when another, greater engine temperature threshold is reached. A second example of the system optionally includes the first example, and further includes wherein the controller stores further instructions to monitor for the conditions of degraded power supply to the power box as a function of an increase in exhaust gas being inducted into the engine via an air intake passage to the engine while the engine is being operated to supply power to the power box and with the vehicle in the condition of reduced air exchange; and discontinue supplying power to the second priority outlets but not the first priority outlets when a first threshold exhaust gas recirculation fraction threshold is reached, and discontinue supplying power to the first priority outlets when a second threshold exhaust gas recirculation fraction threshold is reached, where the first threshold exhaust gas recirculation fraction threshold is lower than the second threshold exhaust gas recirculation fraction threshold.

In another embodiment, a method comprises, in response to a request to operate an engine of a vehicle to power one or more external loads while the vehicle is stationary, and further in response to an indication that the vehicle is in a condition of reduced air exchange, supplying power to the one or more loads via engine operation, retrieving in real-time one or more parameters related to a level of unmetered exhaust gas being inducted into the engine and engine temperature, and sending the parameters to a real-time display for viewing by the vehicle operator. In one example, the real-time display is associated with a vehicle instrument panel located within a cabin of the vehicle. Additionally or alternatively, the real-time display is displayed on a computing device used by the vehicle operator, such as a smartphone, laptop, tablet, etc. The real-time display may include thresholds related to the level of unmetered exhaust gas being inducted into the engine, and may include other thresholds related to engine temperature. In this way, the vehicle operator may monitor in real-time the level of unmetered exhaust gas being inducted into the engine in relation to particular thresholds, which may enable mitigating action on the part of the vehicle operator to be taken based on such information. Similarly, the vehicle operator may monitor in real-time engine temperature in relation to particular thresholds, which may enable mitigating action on the part of the vehicle operator to be taken based on such information. In such a method, the method may further include displaying in real-time parameters related to a time duration until it is inferred that fuel in the fuel tank will be depleted. In such a method, the method may further include displaying in real-time parameters related to current engine speed for operating in PttB mode.

In yet another embodiment, a method comprises in a first condition that includes a request to operate the vehicle in PttB mode, controlling engine operation as a function of a level of exhaust gas being drawn into the engine by way of an air intake passage and as a function of a temperature of the engine, and in a second condition, controlling engine operation as a function of the temperature of the engine and not the level of exhaust gas being drawn into the engine by way of the air intake passage. In such a method, the first condition includes an indication that the vehicle is in a location of reduced air exchange, whereas the second condition includes an indication that the vehicle is not in a location of reduced air exchange.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
via a controller, detecting that a vehicle is in a condition of reduced air exchange; and responsive to a request to operate an engine of the vehicle to power one or more loads external to the vehicle while the vehicle is stationary, generating an alert of the reduced air exchange and discontinuing engine operation if a response to the alert is not received from a vehicle operator within a threshold duration.

2. The method of claim 1, wherein detecting that the vehicle is in the condition of reduced air exchange includes an indication of a loss of communication with a threshold number of global positioning system satellites.

3. The method of claim 1, wherein detecting that the vehicle is in the condition of reduced air exchange is based on a driving route that is learned over time and stored at the controller.

4. The method of claim 1, further comprising discontinuing engine operation in response to an indication that the one or more loads external to the vehicle have been disconnected from a power box that receives power from operation of the engine prior to the response to the alert being received.

5. The method of claim 1, wherein the condition of reduced air exchange includes the vehicle being in a location in which operation of the engine leads to an increase in a concentration of exhaust gas in air surrounding the vehicle over time.

6. The method of claim 1, further comprising operating the engine to power the one or more loads external to the vehicle when the response to the alert is received from the vehicle operator within the threshold duration; and
monitoring an increase in exhaust gas being inducted into the engine by way of an air intake passage to the engine while the engine is in operation.

7. The method of claim 6, further comprising:
reducing a rate at which an exhaust gas recirculation valve positioned in an exhaust gas recirculation system is duty cycled to compensate for the increase in exhaust gas being inducted into the engine by way of the air intake passage to the engine.

8. The method of claim 6, further comprising:
advancing a timing of spark provided to one or more cylinders of the engine to compensate for the increase in exhaust gas being inducted into the engine by way of the air intake passage to the engine.

9. The method of claim 6, further comprising:
in response to the increase in exhaust gas being inducted into the engine reaching a first threshold, notifying the vehicle operator that operation of the engine will be discontinued if action is not taken to mitigate the condition of reduced air exchange.

10. The method of claim 9, further comprising, in response to the increase in exhaust gas being inducted into the engine reaching a second threshold that is greater than the first threshold, discontinuing operation of the engine.

11. The method of claim 1, further comprising monitoring a temperature of the engine while the engine is operating to power the one or more loads external to the vehicle; and
in response to the temperature of the engine reaching a first engine temperature threshold, alerting the vehicle operator of a request to open a hood of the vehicle to reduce the temperature of the engine, and in response to the temperature of the engine reaching a second engine temperature threshold that is greater than the first engine temperature threshold, discontinuing operation of the engine.

12. A method comprising:
operating an engine of a vehicle to power an external load where the engine is stationary and is operating under a condition of reduced air exchange;
monitoring an increase in exhaust gas being inducted to the engine via an air intake passage to the engine;
communicating to a vehicle operator the increase with respect to a first threshold increase and a second threshold increase; and
shutting down the engine responsive to the second threshold increase being reached.

13. The method of claim 12, wherein communicating to the vehicle operator the increase involves notifying the vehicle operator that the increase in exhaust gas being inducted to the engine has reached the first threshold increase and of an impending engine shutdown if mitigating action is not taken to increase air circulation in a vicinity of the vehicle.

14. The method of claim 12, wherein the first threshold increase is lower than the second threshold increase.

15. The method of claim 12, wherein communicating to the vehicle operator the increase is via one or more of an audible message, a visual message via a vehicle instrument panel, and a text-based message sent to a computing device used via the vehicle operator.

16. The method of claim 12, wherein communicating to the vehicle operator the increase is via a real-time display on a screen located in the vehicle, where the real-time display depicts the increase in exhaust gas being inducted to the engine by way of the air intake passage as a function of time.

17. The method of claim 12, wherein operating the engine to power the external load under the condition of reduced air exchange further comprises:
issuing an alert to the vehicle operator of the condition of reduced air exchange, where the alert includes a request for input in order to proceed with operating the engine to power the external load under the condition of reduced air exchange; and
shutting down the engine if the request for input is not received within a predetermined duration of issuing of the alert.

18. A system for a vehicle, comprising:
an onboard navigation system;
a power box for supplying power to one or more loads external to the vehicle, where the power box includes outlets of varying priority including at least first priority outlets and second priority outlets and where operation of an engine supplies power to the power box; and
a controller with computer readable instructions stored on non-transitory memory that, when executed, cause the controller to:
with the vehicle stationary, receive a request to operate the engine to supply power to the power box;
via the onboard navigation system, determine whether the vehicle is in a condition of reduced air exchange and if so, issue an alert to an operator of the vehicle requesting input to the controller in order proceed with operation of the engine;
responsive to the requested input being received, operate the engine to supply power to the power box and monitor for conditions of degraded power supply to the power box; and
selectively discontinue supplying power to the first priority outlets and the second priority outlets based on the conditions of degraded power supply to the power box.

19. The system of claim 18, further comprising:
one or more engine temperature sensor(s) for use in monitoring the conditions of degraded power supply to the power box as a function of engine temperature; and
wherein the controller stores further instructions to discontinue supplying power to the second priority outlets but not the first priority outlets when an engine temperature threshold is reached, and discontinue supplying power to the first priority outlets when another, greater engine temperature threshold is reached.

20. The system of claim 18, wherein the controller stores further instructions to monitor for the conditions of degraded power supply to the power box as a function of an increase in exhaust gas being inducted into the engine via an air intake passage to the engine while the engine is being operated to supply power to the power box and with the vehicle in the condition of reduced air exchange; and discontinue supplying power to the second priority outlets but not the first priority outlets when a first threshold exhaust gas recirculation fraction threshold is reached, and discontinue supplying power to the first priority outlets when a second threshold exhaust gas recirculation fraction threshold is reached, where the first threshold exhaust gas recirculation fraction threshold is lower than the second threshold exhaust gas recirculation fraction threshold.

\* \* \* \* \*